July 17, 1956 H. C. JONES 2,754,630

GRINDING MACHINE

Filed Sept. 24, 1952 12 Sheets-Sheet 1

INVENTOR

Henry C. Jones.

BY R. S. C. Dougherty.

ATTORNEY

July 17, 1956 H. C. JONES 2,754,630

GRINDING MACHINE

Filed Sept. 24, 1952 12 Sheets-Sheet 2

INVENTOR

Henry C. Jones.

BY R. S. C. Dougherty.

ATTORNEY

GRINDING MACHINE

Filed Sept. 24, 1952 12 Sheets-Sheet 3

INVENTOR

Henry C. Jones.

BY R. S. C. Dougherty.

ATTORNEY

INVENTOR
Henry C. Jones.
BY R. S. C. Dougherty
ATTORNEY

GRINDING MACHINE

INVENTOR

Henry C. Jones.

BY R. S. C. Dougherty

ATTORNEY

July 17, 1956 H. C. JONES 2,754,630

GRINDING MACHINE

Filed Sept. 24, 1952 12 Sheets-Sheet 6

INVENTOR

Henry C. Jones.

BY R. S. C. Dougherty

ATTORNEY

July 17, 1956 H. C. JONES 2,754,630

GRINDING MACHINE

Filed Sept. 24, 1952 12 Sheets-Sheet 7

INVENTOR

Henry C. Jones.

BY R. S. A. Dougherty.

ATTORNEY

INVENTOR
Henry C. Jones.
BY R. S. C. Dougherty.
ATTORNEY

July 17, 1956 H. C. JONES 2,754,630

GRINDING MACHINE

Filed Sept. 24, 1952 12 Sheets-Sheet 9

INVENTOR

Henry C. Jones.

BY R. S. A. Dougherty.

ATTORNEY

July 17, 1956 H. C. JONES 2,754,630

GRINDING MACHINE

Filed Sept. 24, 1952 12 Sheets-Sheet 10

INVENTOR

Henry C. Jones.

BY R. S. C. Dougherty.

ATTORNEY

July 17, 1956 H. C. JONES 2,754,630

GRINDING MACHINE

Filed Sept. 24, 1952 12 Sheets-Sheet 11

INVENTOR

Henry C. Jones.

BY R. S. C. Dougherty.

ATTORNEY

July 17, 1956 H. C. JONES 2,754,630

GRINDING MACHINE

Filed Sept. 24, 1952 12 Sheets-Sheet 12

INVENTOR

Henry C. Jones.

BY R. S. C. Dougherty.

ATTORNEY

United States Patent Office 2,754,630

Patented July 17, 1956

2,754,630

GRINDING MACHINE

Henry C. Jones, Sparrows Point, Md., assignor to Patapsco and Back Rivers Railroad Company, a corporation of Maryland Application September 24, 1952, Serial No. 311,189

26 Claims. (Cl. 51—48)

This invention relates to improvements in grinding machines adapted for use in grinding axle journals and the tread surfaces and flanges of car and locomotive wheels.

This application has certain improvements over Patent No. 2,578,250 granted to me December 11, 1951, and is a stationary precision tool for regrinding worn locomotive and car wheels and axle journals.

This grinder is a modified version in that it is portable and is designed and built to accommodate a wide variety of rail equipment.

The grinder is designed to handle wheels and axles for passenger cars, freight cars, tenders, diesel and steam locomotives and other special equipment that comes within the capacity of the machine.

Whenever the equipment permits, the wheels can be ground without removing axle assemblies from the trucks.

Special emphasis has been placed on making the parts rigid so that distortion is minimized, even when making very heavy grinding cuts, and smooth, true surfaces will be developed.

One of the objects of my invention relates to the manner of mounting the support bar upon which the grinding heads are mounted so that its bearings can be adjusted for grinding different sized wheels.

Another object of my invention relates to the grinding head elevating mechanism for imparting vertical motion to the grinding wheels, which mechanism consists of a gear reducer which is chain and sprocket driven by an hydraulic motor, and a vertically mounted feed screw driven by the gear reducer.

A further object of my invention relates to the construction of the wheel centers. Both the centering spindles and the supports for the same can be adjusted. Each pedestal has a machined tongue on the bottom which slides in a machined slot in the base plate for the machine, and a means is provided for locking the pedestal in the desired position.

A further object of my invention relates to the wheel and axle drive attachment. The device used consists of a pair of pneumatic or solid rubber tires which are rotated by a motor and a variable speed reducer with a double strand chain and sprocket power transmission and wheel rotation is accomplished by forcing the rubber tires into contact with one of the wheels to be ground. Torque developed in the preloaded tires is thus transferred to the wheels at a steady uniform rate.

Another object of my invention relates to the journal grinding attachment, which is mounted directly on the main base plate at the front of the machine. A tongue is provided on the base of the attachment to locate and register this unit in the machined groove in the base plate of the machine. A wide range of longitudinal locations are possible since the hold down bolts can be assembled into the same series of tapped holes used for the pedestals for the centers. Motion is imparted to the grinding wheels both manually and hydraulically.

Another object of my invention relates to the hydraulic control system. All vertical and horizontal movements of the grinding heads for the wheels are accomplished hydraulically. The systems are designed to produce slow or rapid movement to the grinding wheels as desired by the operator. Two hydraulic circuits are provided, each serving one of the two grinding heads for the wheel treads and flanges. One circuit also includes the hydraulic cylinder for producing the left and right movements for the grinding wheel for the journal grinding operation.

These and other objects of the invention will be apparent to persons skilled in this art from a study of the following description and the claims appended thereto.

Having thus given a general description of the objects of my invention, I will now in order to make the same more clear, refer to the annexed twelve sheets of drawings forming a part of this specification and in which like characters of reference denote like parts.

Figure 1:
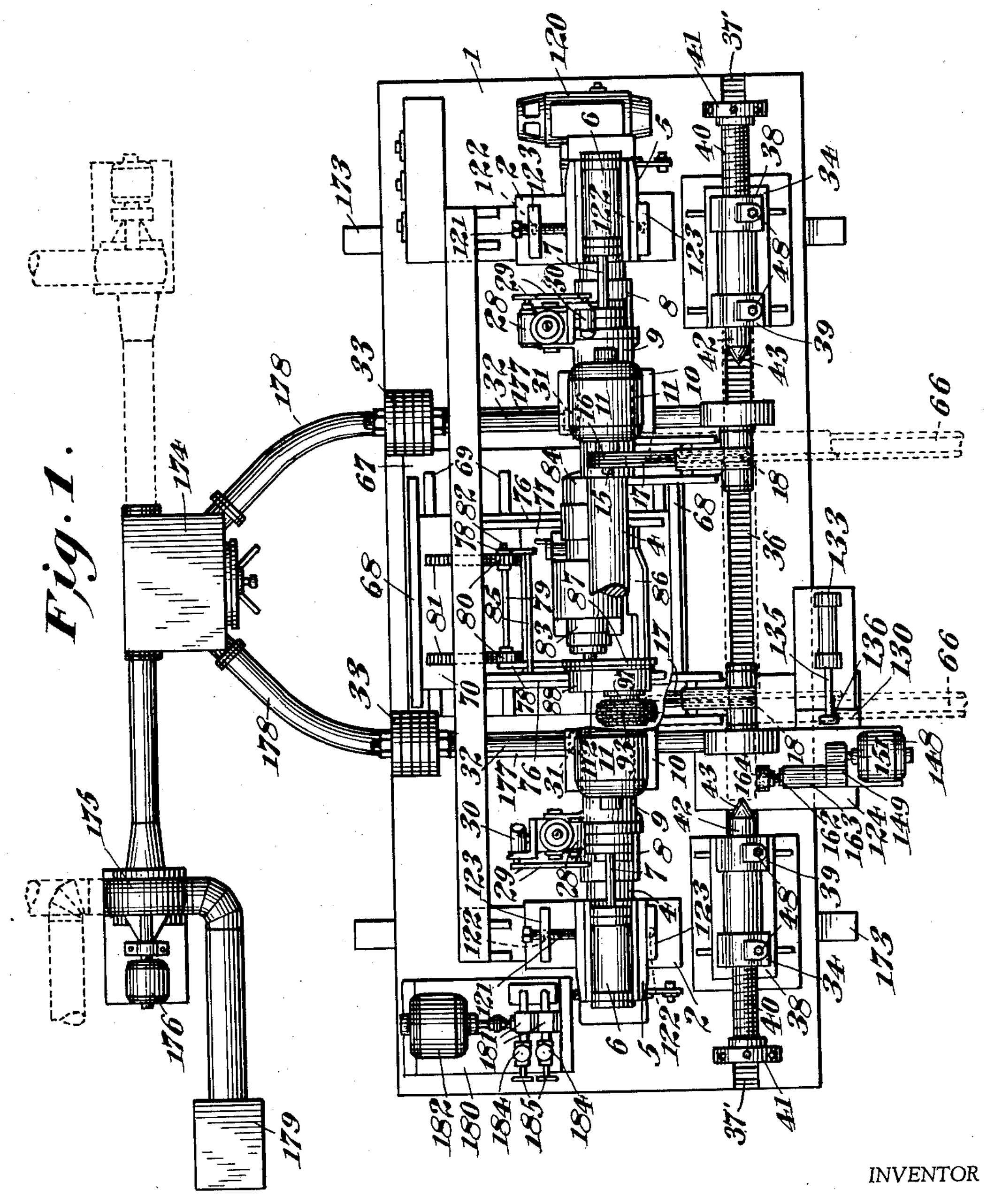
Figure 1 is a top plan view showing the general arrangement of my improved grinding machine with an axle and a pair of wheels in position for grinding the tread surfaces of the same shown in dotted lines and indicating the means for rotating the wheels and axle during the grinding operation, and with parts broken away to more clearly show the construction.
Figure 2:
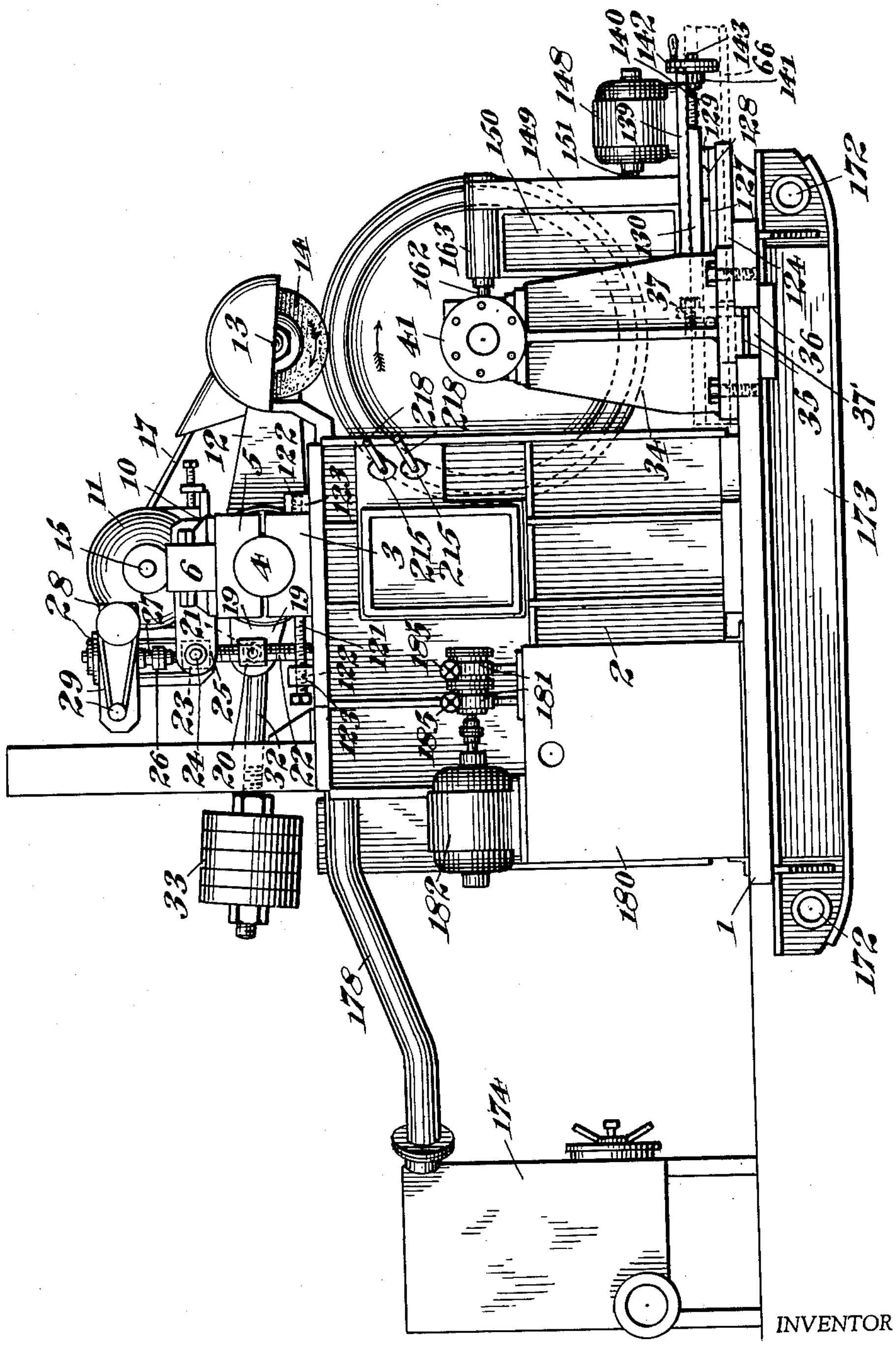
Fig. 2 is a left side elevation of the general arrangement of the machine shown in Fig. 1.

Referring now to the drawings in detail, the numeral 1 indicates the base plate of the machine upon which is mounted a pair of end frames 2 which are right and left, but of similar construction, each formed of a plurality of plate members cut into the required shape and welded together and secured at their lower ends to the base plate 1. Bearing blocks 3 are secured to the top of each end frame 2, for receiving the ends of a support bar 4 and for holding it to prevent rotary movement and upon which the grinding wheel assemblies and the means for vertically and horizontally adjusting the grinding wheels are carried. Each bearing block 3 is provided with a cap 5 upon which is mounted an hydraulic cylinder 6 having a piston rod 7 extending to and attached to a coupling member 8 which is a split collar splined for horizontal movement on the support bar 4. Three separate piston rods 7 of different lengths are supplied to accommodate wheels for track gauges of 36 to 66 inches. Said member 8 is secured to the tubular portion 9 of the motor and grinding wheel support. The tubular body portion has a bracket 10 extending upwardly therefrom for supporting a motor 11 and has an extending arm 12 to the outer end of which is mounted a spindle 13 for the grinding wheel 14. The shaft 15 of the motor 11 has a pulley 16 mounted thereon which is connected by means of a belt 17 with a pulley 18 on the spindle 13 for the grinding wheel 14.

As the manner of coupling the members 8 and 9 together and mounting the motor and grinding head is quite clearly shown and described in my above-mentioned Patent No. 2,578,250, and as these features are not specifically claimed in the present application a more detailed description thereof is not thought necessary.

The tubular member 9 also has another arm 19 extending therefrom and provided with a threaded nut 20 pivoted thereto as at 21 for receiving a lead screw 22 mounted for rotation but held against vertical movement. The upper end of this lead screw is reduced and journalled in a bearing 23 which is held against vertical movement by being pivoted as at 24 to a bracket 25 which is mounted on the horizontal moving coupling member 8. The upper end of said lead screw is coupled as at 26 to a shaft 27 which extends upwardly to a gear reducer 28 connected by a chain and sprocket drive 29 to a hydraulic motor 30. In this manner the lead screw 22 is adapted to rotate the tubular portion 9 of the motor and grinding wheel a partial revolution, which may be 45°, more or less. To normally hold the grinding wheel 14 raised the tubular portion 9 of the motor and grinding wheel support is provided with a boss 31 in which is threaded one end of a rod 32 which has a weight 33 mounted on its opposite end.

Figure 24:
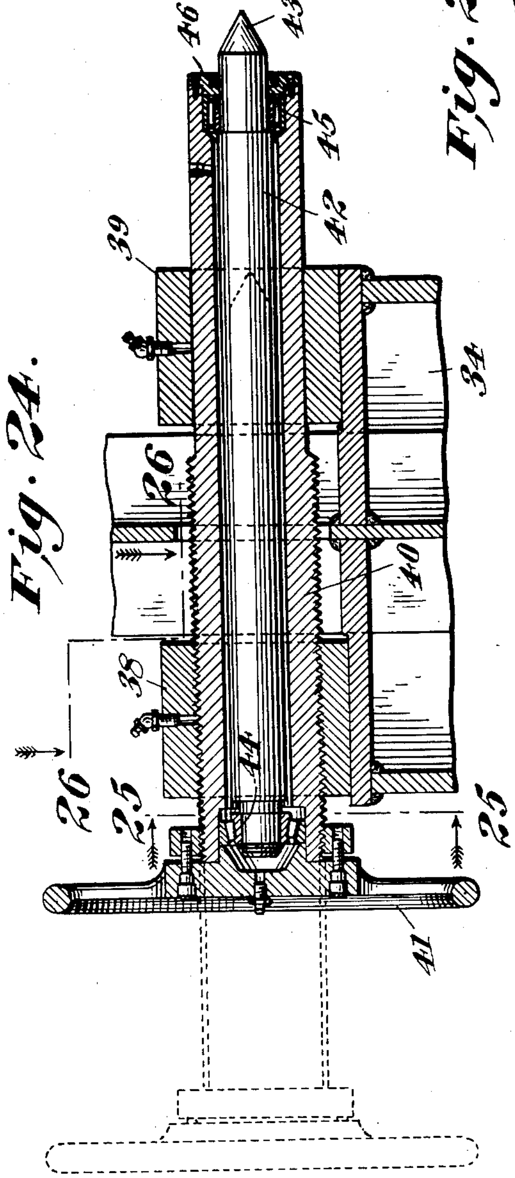
Fig. 24 is a vertical horizontal section through the assembly of one of the wheel centers.
Figure 26:
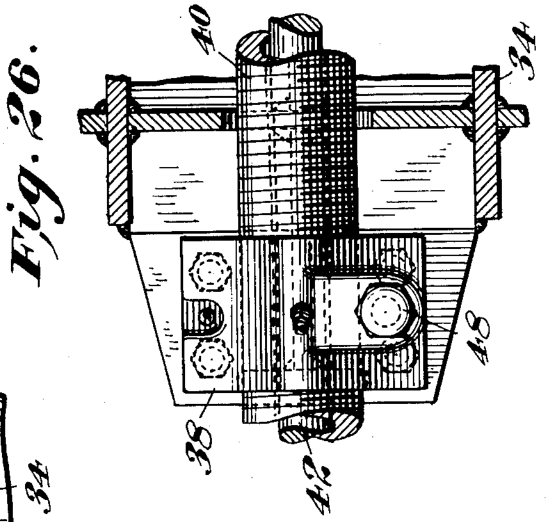
Fig. 26 is a longitudinal section taken on the line 26—26 of Fig. 24.
Figure 25:
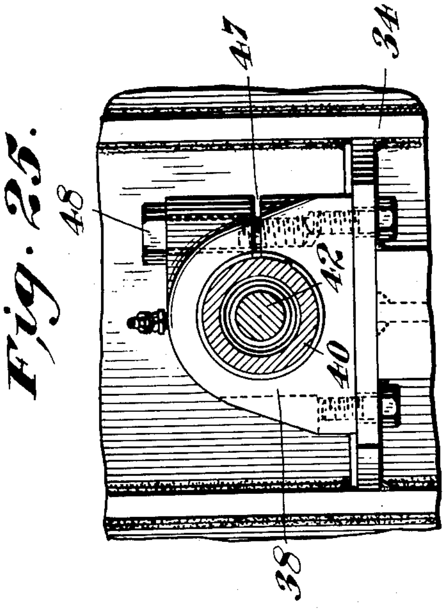
Fig. 25 is a transverse section taken on the line 25—25 of Fig. 24.
Figure 29:
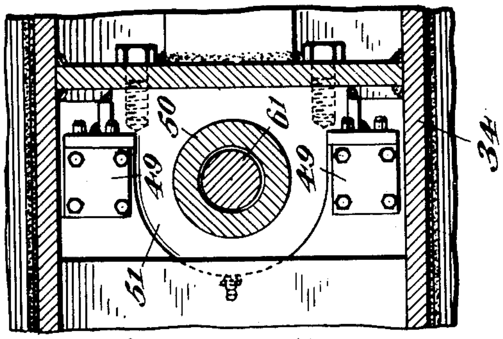
Fig. 29 is a transverse section taken on the line 29—29 of Fig. 28.
Figure 28:
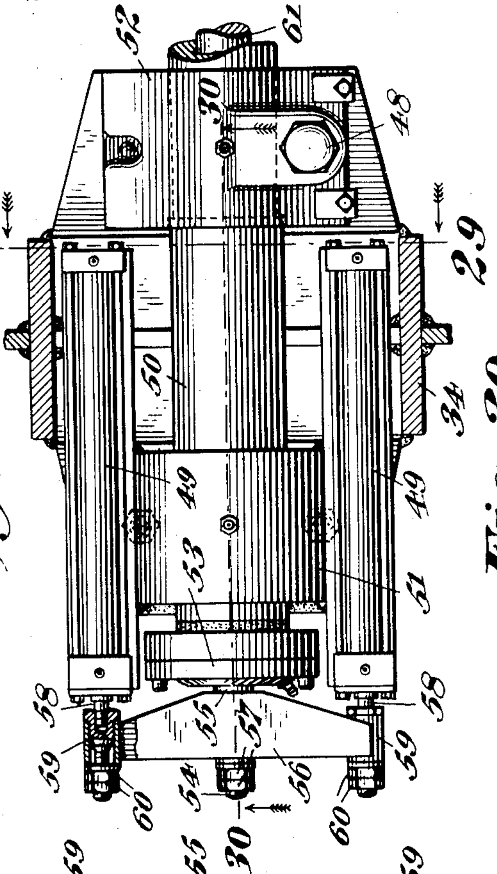
Fig. 28 is a top plan view of an assembly wheel center with hydraulic feed.
Figure 30:
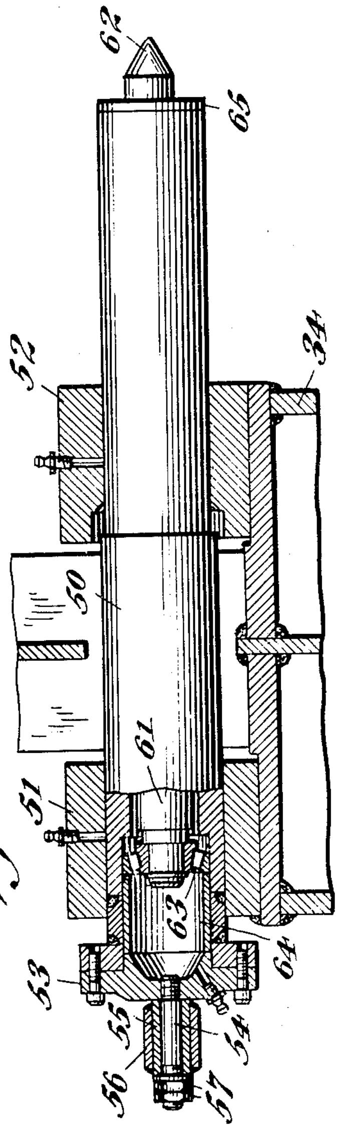
Fig. 30 is a longitudinal section taken on the line 30—30 or Fig. 28 with parts in elevation.
Figure 27:
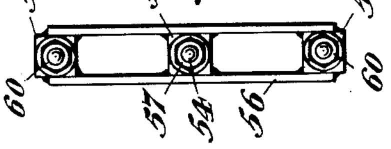
Fig. 27 is a detail front elevation of a cross yoke applied as shown in Figs. 28 and 30.

A pedestal 34 for the wheel centers is adjustably mounted on and secured by bolts to the base plate 1 adjacent to each end frame 2. The wheel center mounted on one pedestal on one side of the machine is in true axial alignment with the wheel center on the other side of the machine with the cone centers facing each other. Each pedestal 34 has a machined tongue 35 on the bottom which extends into a machined slot 36 in the base plate 1, and is also provided with a locking device as at 37. A series of notches or serrations 37′ in the bottom of said slot 36 will assist in making manual adjustments of the position of the pedestals 34 by means of a bar or jack (not shown), before said pedestals are bolted down. As indicated in Figs. 24 to 26 bearings 38 and 39 are mounted and secured to the top of each pedestal 34 for receiving a tubular casing 40 provided with a hand wheel 41 attached to its outer end. The outer end portion of the casing 40 is threaded into the bearing 38, while the inner end portion of the casing 40 is smooth and slidably mounted in bearing 39. A shaft 42 formed with a cone center 43 at its inner end is mounted in the casing 40. The shaft 42 has its end portions reduced and supported in roller bearings 44 and 45. The inner end of the tubular casing 40 is provided with a cap plate 46, for retaining the roller bearings 44 and 45 and the shaft 42 in position. The bearings 38 and 39 are split as indicated at 47 and are provided with a set bolt 48 to give the desired pressure on the casing 40. By rotation of the casing 40 by means of the hand wheel 41 the centers will be advanced or retracted by means of the threaded portion of the casing 40 engaging the threads in bearing 38.

In Figs. 27 to 30 I have shown a modification in which the wheel center is actuated hydraulically which may be a single cylinder or by means of a pair of hydraulic cylinders 49 as indicated or a modification thereof. The casing 50 has a smooth outer face and is slidably mounted in bearings 51 and 52. The casing 50 has a tail cap 53 secured thereto which is provided centrally with a short shaft 54 threaded thereto and extending outwardly therefrom through a spacing block 55 mounted in the central portion of a yoke 56 and secured in place by means of nuts 57. The ends of the piston rods 58 for the cylinders 49 are connected to spacing blocks 59 at the ends of the yoke 56 and secured thereto by means of nuts 60. The shaft 61 in the casing 50 is similar to the shaft 42 in Fig. 24, having a cone center 62 at the inner end and the outer end of said shaft 61 being reduced for receiving a roller bearing 63, with a spacing collar 64 between the roller bearing 63 and the tail cap 53, while the inner end of the casing 50 is provided with a cap plate 65 for holding the shaft 61 and bearing 63 in place.

A pair of rails 66 is provided for rolling the mounted wheels and trucks up to the machine. The rails should extend a short distance behind the wheel centering spindles and should be parallel to the frames as shown in Fig. 1 on the general arrangement drawing, and equidistant from the center line of the machine. These rails are arranged so that they can be removed to clear the journal grinding attachment when performing an axle grinding operation. The rails must also be removed when grinding very large diameter steam locomotive wheels. Holes may be drilled in the base plate 1 as desired to accommodate clamps for the rails. Rails can be extended if desired completely across the base plate, through the machine, for handling three axle trucks. These rails must be removable, however, so that drive attachment for turning mounted wheels and axles can be bolted into position.

All types of equipment other than diesel electric locomotives and the like require an auxiliary means for driving the wheels and axles during the various grinding operations. The device used, consists of a pair of pneumatic or solid rubber tires which are rotated by a motor driven variable speed reducer through double strand roller chain and sprocket-connections. This driving means is illustrated in Figs. 1, 3, 7 to 10 and consists of a supporting plate 67 for the wheel and axle drive attachment which is mounted on the base plate 1 of the machine and bolted thereto. This supporting plate 67 is provided on its upper surface adjacent to each longitudinal edge with a clamp rail 68 bolted thereto, and the supporting plate 67 is also provided on its upper surface with spaced longitudinally extending bars 69 welded in place and adapted to form slideways for a slide plate 70. One of the transverse edges of said slide plate 70 is formed centrally with a pair of spaced flanges 71 in which is journaled a shaft 72 on which a pinion 73 is mounted for engaging a rack 74 secured centrally to the top of the supporting plate 67. One end of the shaft 72 is squared as at 75 for receiving a wrench for turning the pinion 73 for longitudinally adjusting the slide plate 70.

The slide plate 70 is further provided at the top surface adjacent to its transverse side edges with clamp rails 76 bolted to the slide plate 70 between which is mounted a slide plate 77 adapted for transverse adjustment. For adjusting the slide plate 77 as shown more clearly in Fig. 8, the upper longitudinal edge is provided with a pair of spaced flanges 78 in the outer ends of which a shaft 79 is journaled, said shaft 79 having a pair of pinions 80 mounted thereon for meshing with the teeth of a pair of rack bars 81 mounted on top of the slide plate 70. One end of the shaft 79 is squared as at 82 for receiving a wrench for turning the pinions 80 to transversely adjust the slide plate 77.

Figures 7, 8:
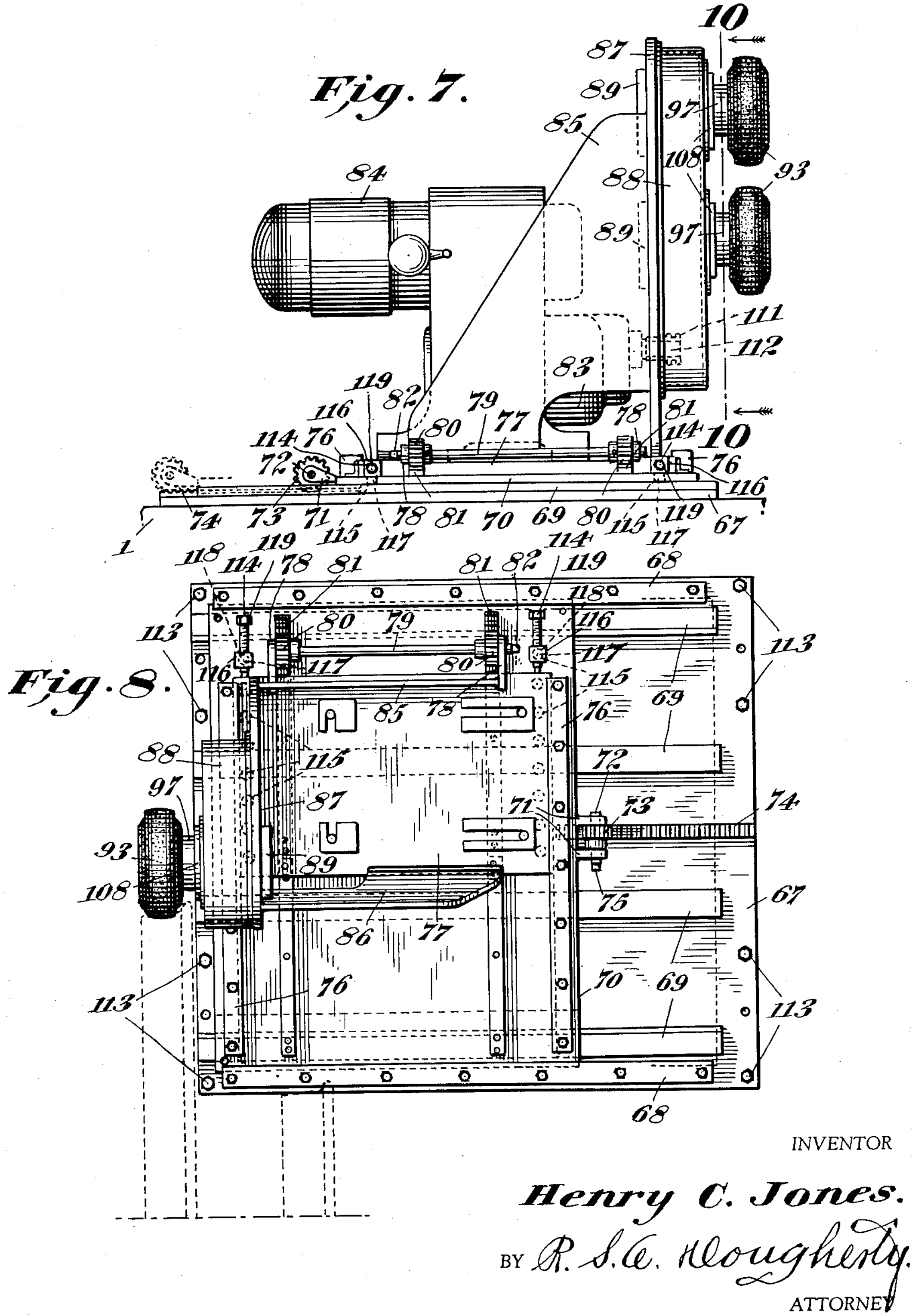
Fig. 7 is a rear elevation of the wheel and axle drive attachment.
Fig. 8 is a top plan view of the wheel and axle drive attachment and supporting base therefor.
Figure 9:
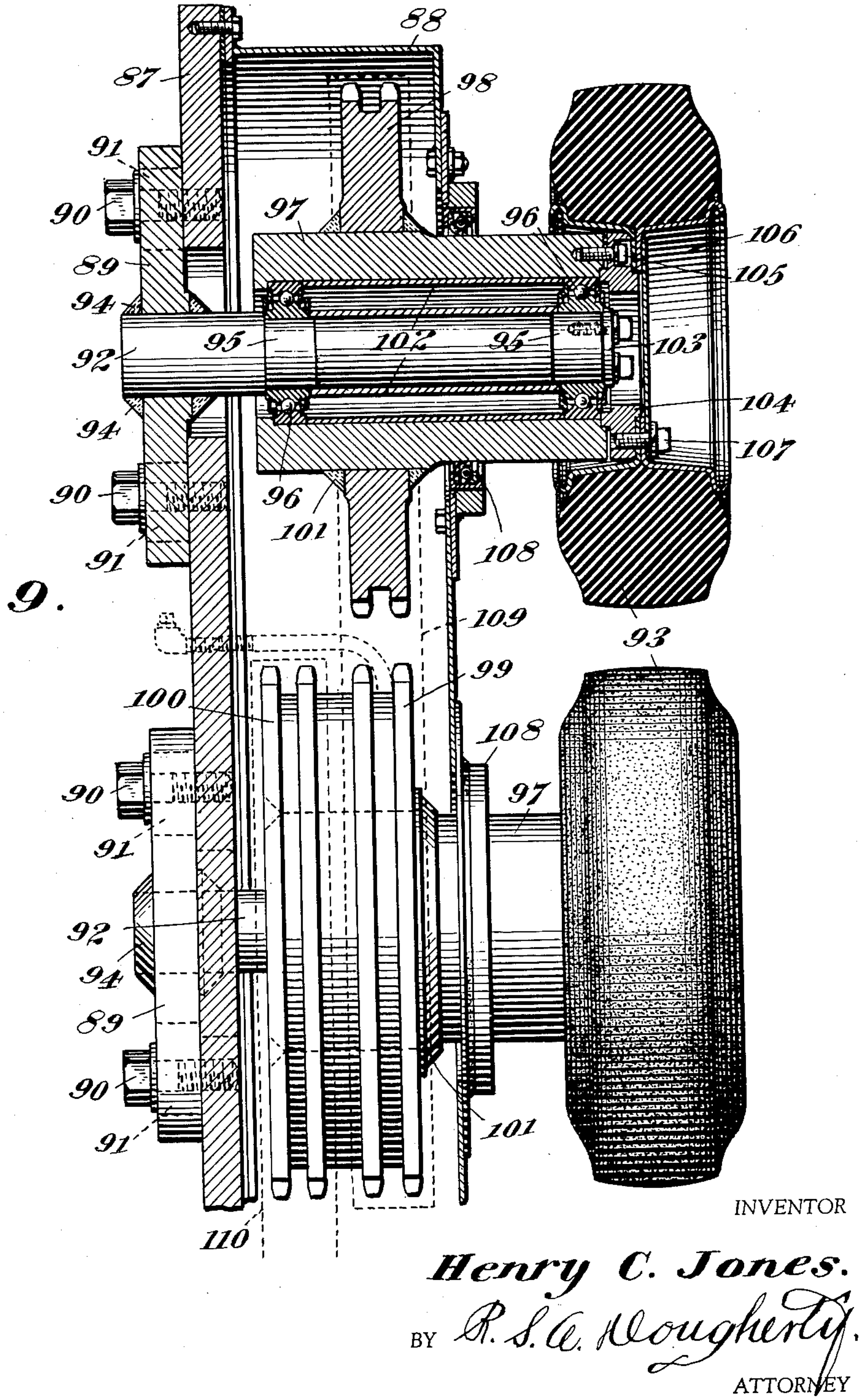
Fig. 9 is a vertical sectional elevation of a portion of the wheel drive taken substantially on the line 9—9 of Fig. 10, but drawn on a larger scale.
Figure 10:
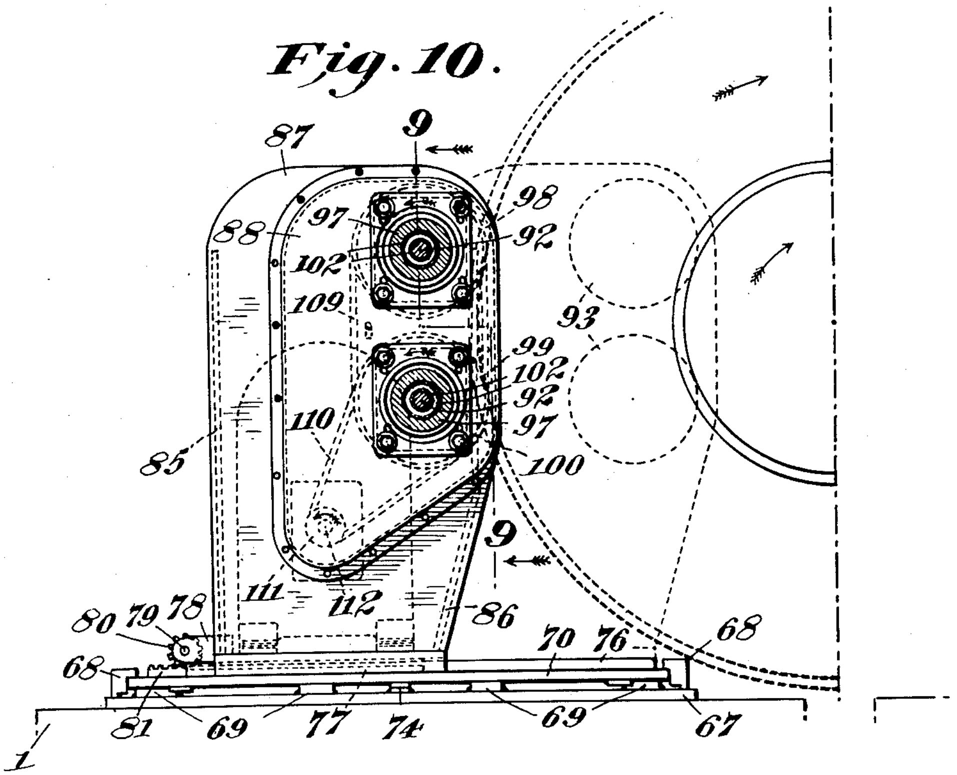
Fig. 10 is a vertical sectional end elevation of the wheel drive taken on the line 10—10 of Fig. 7.

A motor 83 and a variable drive 84 is mounted on the longitudinal central portion of the slide plate 77 (Fig. 7). Said slide plate 77 is provided at each of its longitudinal sides and one transverse end with vertical plates 85, 86 and 87, respectively, which are secured at their lower ends to the slide plate 77. The end plate 87 is adapted to support a cover 88 for the axle driving mechanism. The end plate 87 has a pair of bearing plates 89 secured thereto by means of bolts 90 which extend through slots 91 in the bearing plates 89 to allow for vertical adjustment. The inner ends for the axles 92 for the driving wheels 93 extend through the bearing blocks 89 and are welded thereto as at 94. The axles 92 extend through the cover 88 and have reduced portions as at 95 for receiving ball bearings 96 for supporting hubs 97 for the sprocket wheels 98, 99 and 100, which are secured thereto by welded connections as at 101. The ball bearings 96 are further held in spaced relation by means of a pair of sleeves 102 and a cap plate 103 is secured to the outer end of each axle for holding the ball bearings 96 and sleeves 102 in place. A collar 104 is secured as at 105 to the outer end of the hub 97. The wheel rims 106 for supporting the driving wheels 93 are attached to the collar 104, by means of bolts 107. The hubs 97 extend through the cover 88 which is provided at this point with a gland 108 to further protect the wheel drive. Both the axles, hubs and friction driving wheels are constructed the same except that the upper hub 97 has a single sprocket wheel 98 mounted thereon while the lower hub has a double sprocket wheel 99 and 100. Sprocket wheels 98 and 99 are connected together by means of a sprocket chain 109 and sprocket wheel 100 is connected by means of a sprocket chain 110 to the driven sprocket wheel 111 on the shaft 112 of the motor 83 as indicated in dotted lines in Figs. 9 and 10.

The wheel drive attachment is used for turning the wheels and axles for all types of equipment except for truck mounted diesel locomotive wheels and axles. When not being used the entire drive may be removed by removing the eight bolts 113 as indicated in Fig. 8 and lifting it out of the way. Before the rolling of the assembly, whether truck or mounted wheels on axles, into the machine the centering spindles and the pedestals therefor should be moved far enough apart to allow the wheels and axles to be rolled or lifted into place. The assembly can then be lifted into place so that the axle centers are in line with the centering spindles. The centering spindles should then be moved to locate the axle. The spindles should then be locked so that the wheels turn freely without bending or excessive looseness.

When adjusting and positioning of the wheel drive attachment is desired, clamp rails 76 on slide plate 70 are loosened and the entire unit is moved far enough back to clear the diameter of the wheel to be ground. This should be done prior to rolling the wheels with axles into the machine.

To assemble the truck or wheel and axle assemblies in the machine preparatory to grinding, the bolts on clamp rails 68 are loosened and the unit moved until the rubber tires are in line with the tread of one of the wheels to be ground, the bolts in the pair of clamp rails 68, which are parallel to the axle are tightened, and the unit is moved toward the wheel until the rubber tires touch the wheel tread, and the clamp rails 76 are hand tightened only. The two screw jacks 114 are assembled in the proper holes 115 and tightened until the proper pressure exists between the rubber tires and the wheel treads. Normally this requires about two or three turns of each jackscrew, then finish tightening the clamp rails 76 and leaving the jackscrews in place.

As shown in Figs. 7 and 8, these jackscrews 114 each comprise a set nut 116 having a cylindrical projection 117 secured in one of a series of holes 115 formed in the slide plate 70, said set nut is also provided with a threaded opening 118 for receiving a set bolt 119.

In the preparation for grinding wheels in a four wheel truck diesel locomotive, the grinding wheel drive is not used and is removed from the machine. The centering spindles and supports are moved far enough apart to allow the truck to be rolled into place, the axle end thrust bearings if used are first removed, the truck is then rolled into the machine until the axle centers are in line with the centering spindles, the end of the truck is then raised so that supporting jacks can be installed underneath, the truck is then lowered onto the jacks and then adjusted until equilibrium exists with the axle center at the same elevation as the centering spindles. The centering spindles are then moved inward to locate the axle and the spindles are locked in place so that the wheels turn freely.

In most shops a three phase alternating current at 220 or 440 volts, 60 cycle is usually furnished as a source of electrical power. All traction motors used on American diesel electric locomotives are series wound direct current machines making a rectifier or motor-generator set necessary. The latter type is the only one worthy of consideration in this case and for this purpose I have shown in Fig. 1 at 120 a motor-generator set mounted on the base plate 1. Some six wheel diesel trucks are designed so that the wheels cannot be ground without interfering with portions of the truck frame, while it is in an upright normal position. In this case, the truck may be inverted prior to being placed in the machine. When inverted there is sufficient clearance to reach and grind all wheels. In some cases, however, where motorized center axles are used, it may be necessary to turn the truck upside down to grind the middle pair of wheels.

Figure 11:
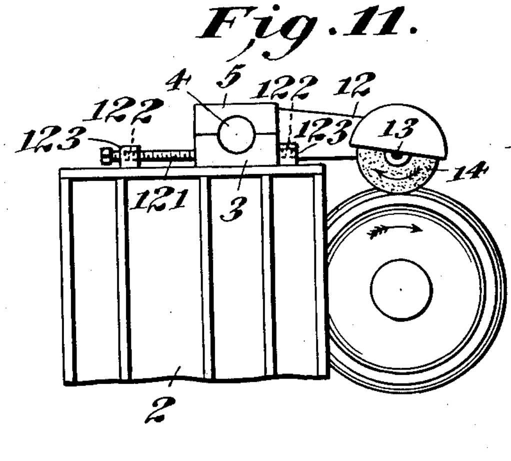
Fig. 11 is a detail illustrating the manner of adjusting the bearing blocks for the support bar shifted toward the front for grinding wheels up to fifty inches in diameter.
Figure 12:
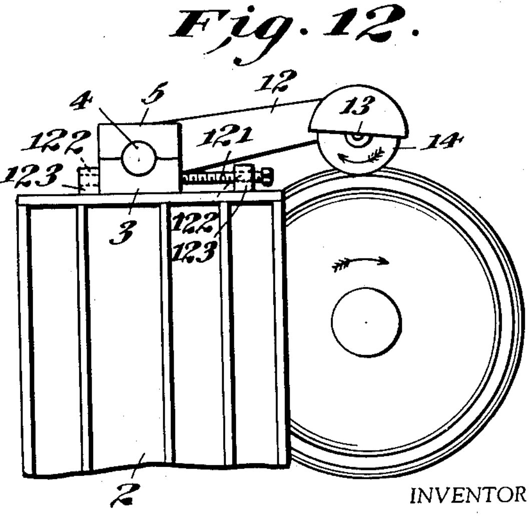
Fig. 12 is a detail illustrating the manner of adjusting the bearing blocks for the support bar shifted toward the back for grinding wheels from fifty-one to sixty-six inches in diameter.

When grinding large diameter wheels it may be necessary to remove the rails 66 which are normally mounted on the base plate 1, in order to have clearance at the bottom. All wheels fifty inches in diameter, and under can be ground with the support bar 4, in the forward position as shown in Fig. 11. When grinding wheels fifty-one inches in diameter and over it is necessary to shift the location of the support bar 4 toward the rear of the machine, to obtain proper clearance as indicated in Fig. 12. Adjusting screws 121 having their threaded ends extending forwardly (Fig. 11) or rearwardly (Fig. 12) through holes 122 in projections 123 extending from the tops of the end frames 2 are provided for moving and holding the bearing blocks 3 forward or back as required. When the rails 66 are removed the wheels and axle assembly may be lifted into place until located by the centering spindles.

Referring now to Figs. 1 to 5, and 13 to 23 which relate more particularly to the journal grinding attachment.

The journal grinding attachment has a bed plate 124 which is mounted on, and directly attached by means of bolts 125 to the base plate 1 at the front of the machine. A tongue 126 is provided on the lower face of the bed plate 124 adapted to locate and register this unit in the machined groove 36 in the base plate 1. A wide range of longitudinal locations are possible since the hold down bolts are assembled into the same series of tapped holes used for the pedestal supports for the centers. A plate member 127 is mounted on top of the bed plate 124 at one side thereof. This plate member 127 is provided on its top face with spaced bars 128 which are secured thereto having their outer edges beveled to engage the inner beveled edges of bars 129 which extend downwardly from a coacting plate member 130 thereby forming a dovetailed slideway. Mounted centrally between the plates 127 and 130 and the spaced bars 128 is a plate member 131 which is secured to the bed plate 124 and plate member 127 by bolts 132. The plate members 127 and 131 extend outwardly from one side of the unit and are adapted to support an hydraulic cylinder 133 having a piston 134 with a piston rod 135, the outer end of which is attached as at 136 to the plate member 130 and adapted when reciprocated to impart longitudinal movement to the unit. The plate member 130 is held against transverse movement by the spaced bars 129 but is provided on its top central portion with a dovetailed slideway 137 for receiving a tongue 138 of a transverse slide plate 139 upon which the unit is directly mounted for transverse movement. The grinding wheel 164 is fed into the work manually and for this purpose a feed screw 140 having its outer end portion blank is journaled in a bearing 141 and provided with a hand wheel 142 which is graduated and held in place by means of a nut 143. The inner end portion of the feed screw is threaded as at 144 and threaded into a split block 145 which is attached to plate member 130 by means of bolts 146. The threaded split block 145 through which the cross feed screw passes can be tightened or loosened to remove lost motion in the threads by means of the set bolts 147 which pass through the split portion of the block.

A motor 148, casing 149 for the belt drive for the grinding wheel spindle and a bracket 150 for supporting the grinding spindle cover are mounted on the transverse slide plate 139. The motor 148 has a shaft 151 extending into the belt casing 149 to which is attached a driven pulley 152 for a pair of V-belts 153. From the driven pulley 152 the pair of V-belts extend to a pair of idler pulleys 154 and 155 having their axles 156 and 157 mounted on a plate 158 attached to the bracket 150 by means of bolts 159 which extend through slots 160 in the plate 158 by means of which the idler pulleys can be vertically adjusted to give the desired belt tension. From the idler pulleys 154 and 155 the V-belts extend upwardly to a double pulley 161 on the outer end of a spindle 162 which extends through a spindle cover 163 with its inner end having a cup grinding wheel 164 for grinding the axle journals attached thereto by means of a nut 165. The journal grinding attachment is designed to accommodate axles from 3 to 14 inches in diameter with lengths from 7 to 18 inches. A shield 166 is provided to catch and direct dust. This shield 165 is attached by means of a clamp 167 secured to the cover 163 and placed immediately over the flying sparks emanating from either side of the grinding wheel and is adjustable by means of an adjusting screw 168.

Figures 3, 4, 5:
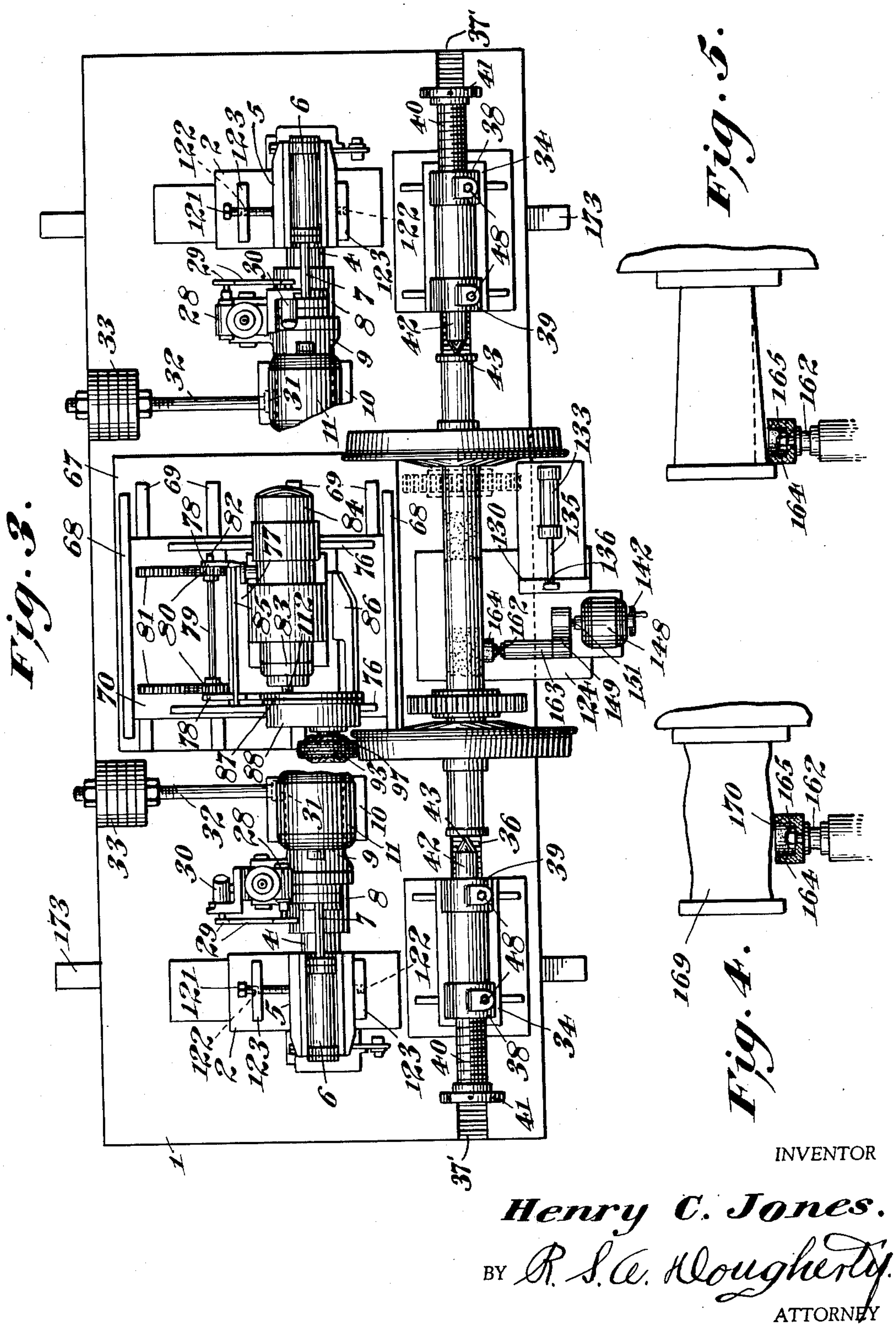
Fig. 3 is a top plan view showing the general arrangement of wheel drive and journal grinding attachment mounted between the wheels shown in full lines.
Fig. 4 is a detail showing one lip of a cup grinding wheel opposite the high spot on the axle bearing and indicating the location of the cup grinding wheel when beginning to grind.
Fig. 5 is a detail illustrating the manner of grinding a tapered axle journal with a cup grinding wheel.

In Fig. 4 is a detail showing the manner of grinding the end of an axle 169 having a high spot at 170. In this figure one lip of the cup grinding wheel is opposite the high spot beginning the grind. The grinding wheel is advanced into the work until sparks just begin to appear. The hand wheel is then turned one division (.002" feed).

The wheel is traversed along the journal until sparks are no longer thrown off. This procedure is repeated until all the high spots are ground down and the journal is cleaned up.

Figures 13, 14, 15, 16:
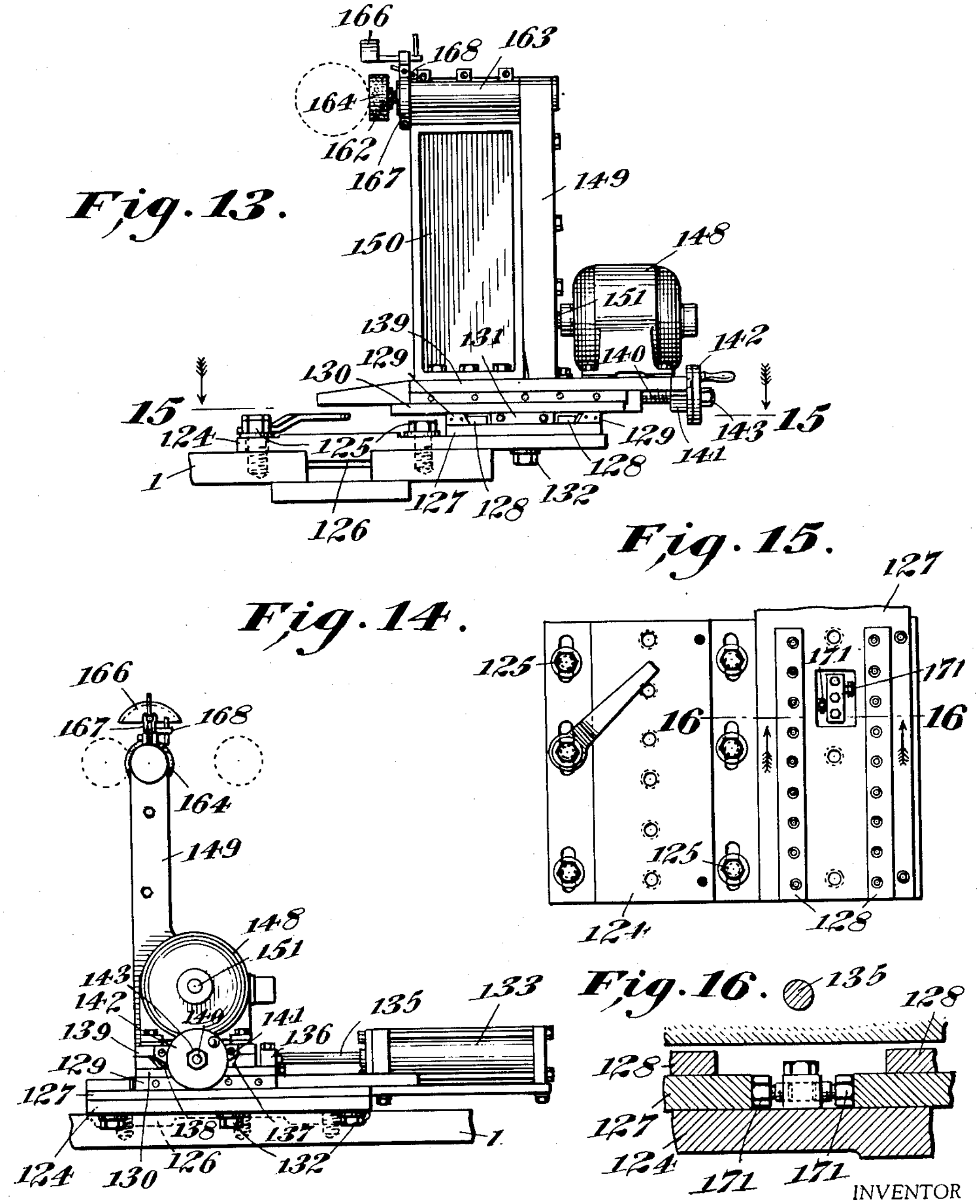
Fig. 13 is a side elevation of the assembly of the journal grinding attachment.
Fig. 14 is a front elevation of the journal grinding assembly shown in Fig. 13.
Fig. 15 is a top plan view of the bed plate for the journal grinding assembly taken on the line 15—15 of Fig. 13.
Fig. 16 is a detail section taken on the line 16—16 of Fig. 15 showing the means for adjusting the grinding cup wheel in relation to the axle.
Figures 17, 18, 19:
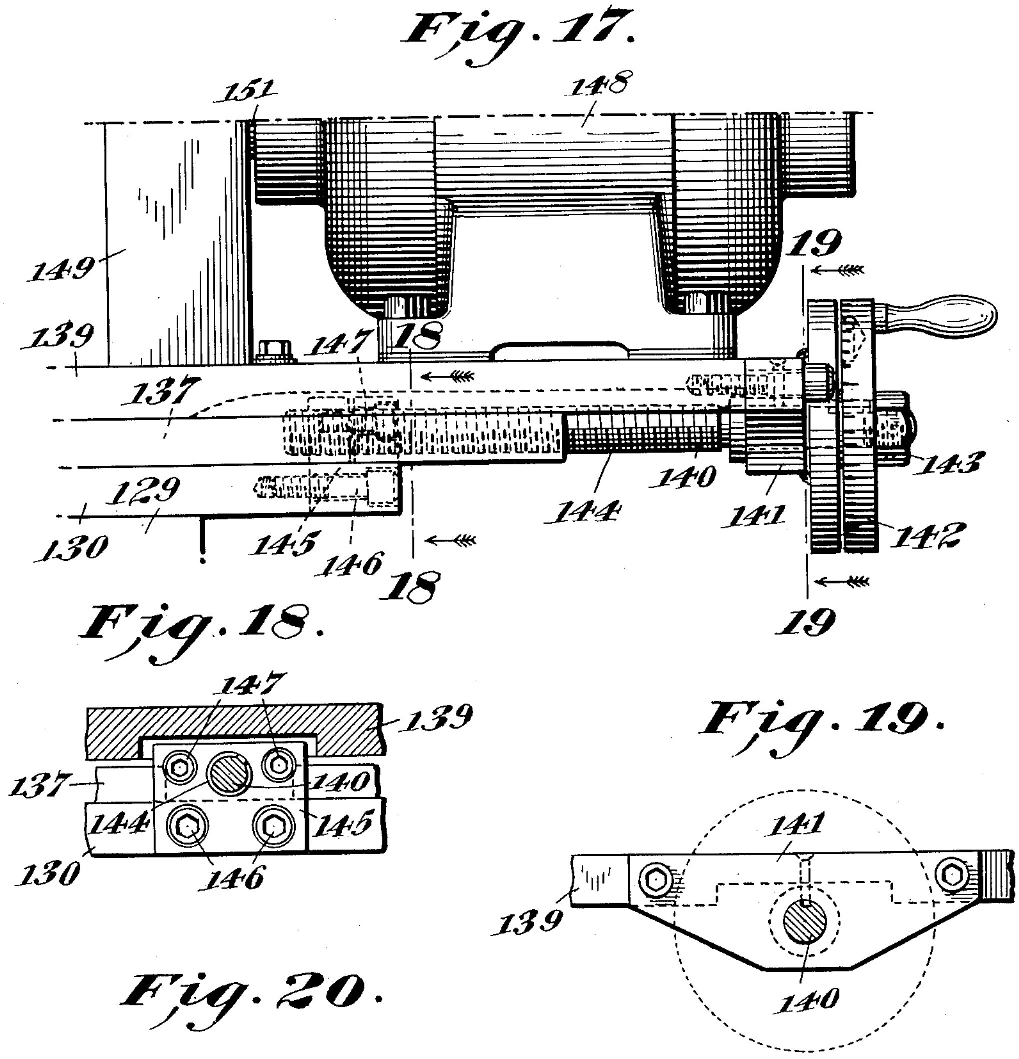
Fig. 17 is a detail showing the cross feed screw and adjacent parts for the journal grinder.
Fig. 18 is a detail cross section taken on the line 18—18 of Fig. 17.
Fig. 19 is a detail cross section taken on the line 19—19 of Fig. 17.
Figure 20:
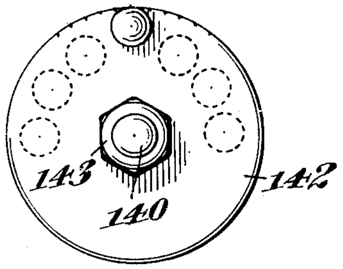
Fig. 20 is a front elevation of the hand wheel for rotating the cross feed screw.
Figures 21, 22, 23:
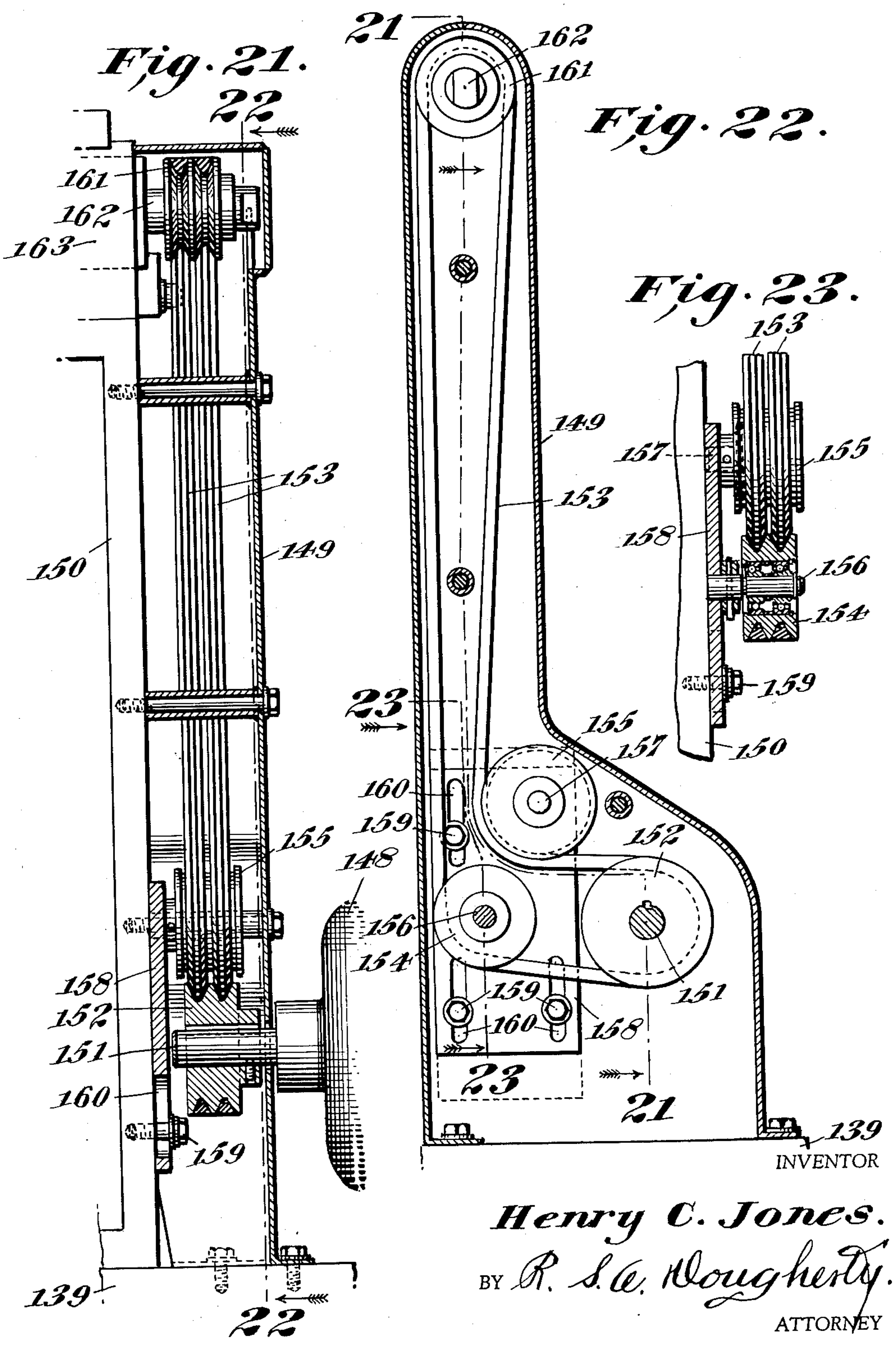
Fig. 21 is a vertical section of the driving mechanism for the grinding spindle for grinding the journal bearings taken on the line 21—21 of Fig. 22.
Fig. 22 is a vertical section of the driving mechanism for the grinding spindle for grinding the journal bearings taken on the line 22—22 of Fig. 21 and 90° to said Fig. 21.
Fig. 23 is a detail section taken on the line 23—23 of Fig. 22.

It is desirable that both lips of the cup grinding wheel be made to grind at the same time. This insures that the entire length of the journal will be cleaned up. However, under certain conditions, single lip grinding will produce a satisfactory finish. The diameter of the journal should be measured at both ends and in the middle to check for taper. If the journal is tapered, the procedure is as follows:

The mechanism is traversed until the two adjusting screws 171 are accessible as shown in Figs. 15 and 16. These screws 171 are below the piston rod 135 of the hydraulic cylinder 133. All but one of the hold down bolts 125 are removed, the one remaining bolt 125 being loosened but remaining in place as a pivot bolt. One adjusting screw 171 is loosened and the other is tightened to pivot the entire journal grinding unit so that the grinding wheel will traverse parallel to the axle. The amount of adjustment depends of course, upon the amount of taper and experience will dictate the proper amount to turn the adjusting screws.

Fig. 5 shows a typical taper with the left end larger in diameter than the right. To correct this condition, one of said adjusting screws 171 is turned so that it will come out of the threaded center block (Fig. 16) and the other screw 171 will then be advanced into said block. This will rotate the upper portion clockwise to its correctly aligned position. Of course, this procedure would be reversed if the taper were in the opposite direction.

The entire grinding machine being portable can be shipped completely assembled on a single flat car. To facilitate handling four large holes 172 are provided one in each end of the two large I-beams 173 which support the base plate 1. If the machine is to be lifted with cables, spreader bars should be used above the machine, so as not to damage piping or wiring or accessories and attachments mounted on the machine. No special foundation is required to support the grinder. Since the machine is very rigid within itself, it may be mounted on any terrain which is capable of carrying the load imposed.

A dust collection system is also provided for the machine consisting of a dust collector 174, blower fan 175 driven by a motor 176, with connection ducts, to safely and efficiently collect particles being ground off the wheels. A sheet metal duct 177 is fastened to the grinding head support arm 12 behind the grinding wheel, and receives the particles ground from the wheel. They are then conducted through a large flexible metallic hose 178 to the dust collector 174, where most of them are trapped, any remaining fine dust particles are then drawn through the fan 175 and discharged into an impingement type filter 179.

Figure 6:
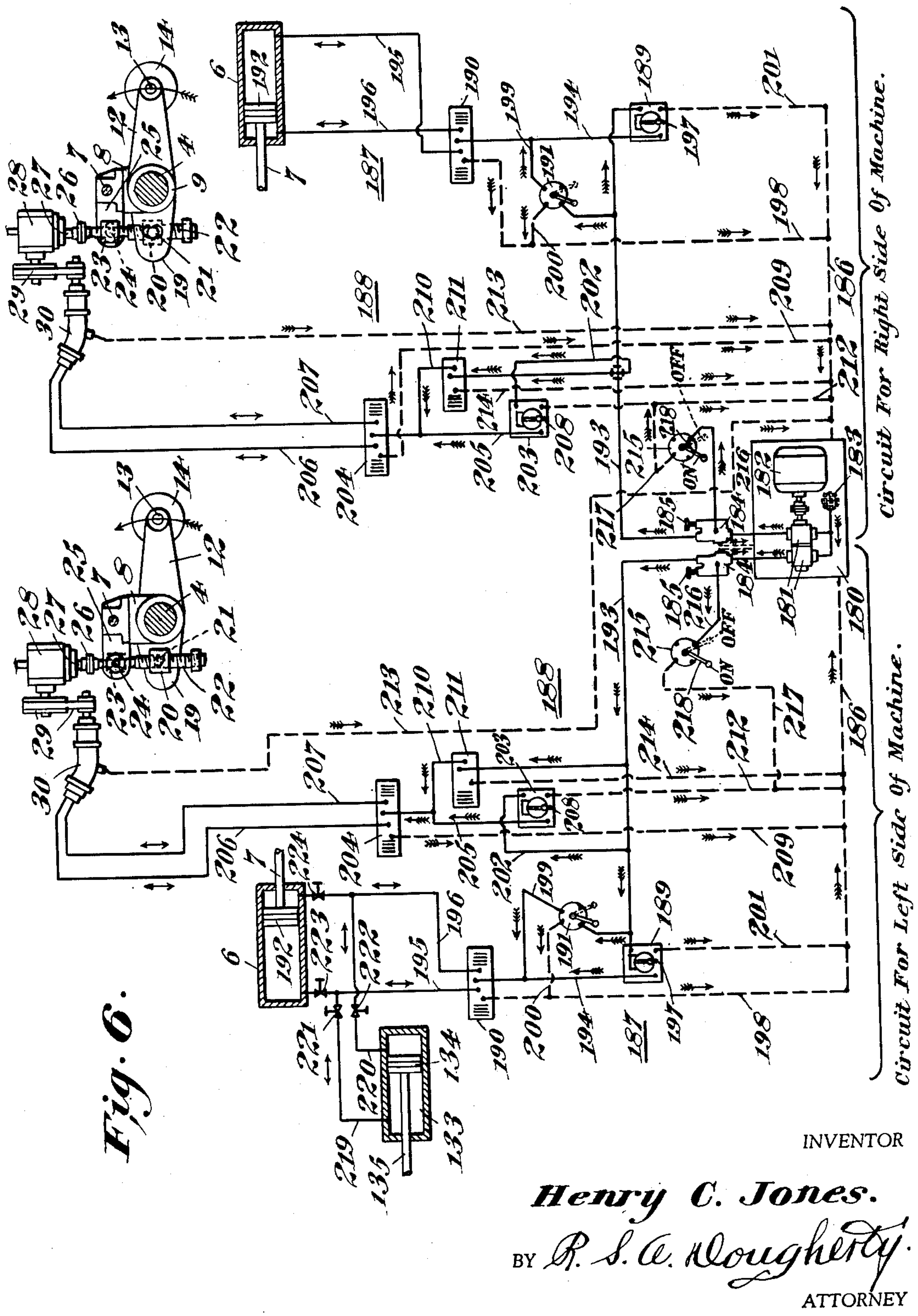
Fig. 6 is a schematic diagram of the hydraulic control system for my improved grinding machine.

All vertical and horizontal movements of the grinding heads are accomplished hydraulically. The systems are designed to produce slow or rapid movement of the grinding wheel as desired by the operator. Two identical hydraulic circuits are provided as shown in Fig. 6, each serving one of the two grinding heads. Since they are duplicates, the description of one will also apply to the other and the same reference numerals for each circuit will be given them.

Referring now to Fig. 6 which shows a schematic diagram of the hydraulic control system for my improved grinding machine. The tank 180 and the motor driven pumps 181, actuated by motor 182 draw oil from the tank, through a fine mesh wire strainer 183, and discharge it through two balanced piston type relief valves 184. The setting of these relief valves at 185 determines the oil pressure in the right and left hand circuits. The circuits are set to operate at substantially 400 pounds per square inch. As indicated in Fig. 6, the outward flow of the oil through the circuits is indicated in full lines and the return flow to the drain manifold 186 and to the tank 180 is indicated in dotted lines.

After passing through the relief valves 184, the oil is distributed into two separate systems 187 and 188. The system 187 controls the horizontal movement and the other 188 the vertical movement of the grinding wheel 14.

The elements comprising the system 187 are: a hydraulic cylinder 6, a metering-in flow control valve 189, a four way solenoid operated valve 190 and a bypass pilot valve 191. The hydraulic cylinder 6 is mounted so that the piston 192 and rod 7 actuates the grinding head and wheel 14, horizontally toward or away from said cylinder. Supplying oil to one end of the cylinder forces the piston 192 to move in the desired direction. Thus the machine is designed to permit grinding cuts to be made with a wheel moving in either direction.

The fluid after passing through the relief valves 184 is connected to system 187 by means of a pipe line 193 which extends to metering-in flow control valve 189 which is connected by means of a pipe line 194 to the solenoid operated four way valve 190 having a pipe connection 195 and 196 to the opposite ends of the hydraulic cylinder 6.

The speed at which the piston 192 moves is determined by the rate of oil flow into the cylinder 6. This flow rate is determined by the metering-in flow control valve 189 placed between the main pump 181 and the cylinder 6. This metering-in valve 189 is equipped with an adjustable micrometer type control handle 197 which permits accurate flow control which in turn is reflected in accurate speed control of the piston 192. The metering-in flow control valve 189 capacity is correlated to the cylinder size to produce the desired horizontal grinding wheel speeds per minute.

The direction in which the grinding wheel is moving is always under control of the operator, since the four way solenoid valve 190 which is located between the metering-in flow control valve 189 and the cylinder 6 permits oil to flow to either end of the cylinder or block the flow depending on which of the solenoids are energized or to exhaust the oil therefrom through the exhaust pipe connection 198 which is connected to the drain manifold 186.

During certain operations it is convenient to traverse the grinding wheel quickly when not grinding. A pilot valve 191 is provided in a bypass line 199 around the metering-in valve 189 to produce this condition. This bypass pipe 199 which extends to the metering-in flow control valve 189, has the other end connected to the pipe line 194 for connecting the metering-in flow control valve 189 with the four-way solenoid valve 190. The pilot valve 191 has an exhaust pipe connection 200 extending to the exhaust pipe connection 198 for the four-way solenoid valve 190 which is connected to the drain manifold 186. The metering-in flow control valve 189 also has an exhaust connection 201 extending to said drain manifold 186.

For controlling the vertical movement of the grinding head, the oil after passing through the relief valve 184 into the pipe line 193 is conducted by means of pipe 202 to a metering-in flow control valve 203 then to a four-way solenoid operated valve 204 by a pipe connection 205 and finally by means of pipe connections 206 and 207 to the reversible hydraulic motor 30. The metering-in flow control valve 203 controls the rate of oil flow which in turn governs the speed of the hydraulic motor 30. This metering-in flow control valve 203 also has a micrometer adjustment 208 for accurate control. The four-way solenoid operated valve 204 permits oil to pass to either pipe connections 206 and 207 to the reversible hydraulic motor 30 depending on which solenoid is energized and control the exhaust of oil therefrom through pipe connection 209 which extends to the drain manifold 186. This arrangement allows the hydraulic motor 30 to turn in either direction which results in raising or lowering the grinding head at any selected speed, within the capacity of the machine. The hydraulic motor 30 drives a gear reducer 28 by means of a chain and sprocket drive 29. The gear reducer 28 is then mechanically connected to the grinding head by means of a lead screw 22. The metering-in flow control valve 203 permits small quantity flow which, through the various speed reducers, results in a $\frac{1}{64}$ to $\frac{1}{4}$ inch per minute vertical movement of the grinding wheel. To speed up this rate of rise or fall when not grinding, the system is equipped with a bypass 210 around the metering-in flow control valve 203 connecting pipe line 205 with pipe connection 193. This bypass 210 includes a three way solenoid operated valve 211 which permits full oil flow to the hydraulic motor 30 which increases its speed and results in a $1\frac{1}{2}$ inches per minute movement of the grinding wheel. The metering-in flow control valve 203, hydraulic motor 30 and the three-way solenoid-operated valve 211 are each provided with exhaust connections 212, 213 and 214 respectively extending to drain manifold 186.

Both sides of the machine may be operated simultaneously or either side may be operated independently. A pilot valve 215 is provided for each side to prevent hydraulic pressure from being developed in the system, said pilot valves 215 having a pipe connection 216 to the relief valve 184 and an exhaust connection 217 extending to exhaust pipe connection 212 which is connected to the drain manifold 186. Turning the valve handles 218 of the pilot valves 215 into the "off" position, unloads the main relief valves 184 and prevents pressure rise by passing all the oil back to the tank 180.

This hydraulic control system also includes the double acting hydraulic cylinder 133 provided with a piston 134 and piston rod 135 connected as at 136 to the slide plate 130 of the journal grinding attachment for producing transverse (left and right movement) of the cup grinding wheel 164. Flow of oil to the hydraulic cylinder 133 is controlled by the same horizontal metering-in flow control valve 189 used to control the hydraulic cylinder 6 during a wheel grinding operation. The allowable rate of flow through this metering-in flow control valve 189 will permit transverse speed to be varied from about $\frac{3}{8}$ to $6\frac{3}{8}$ inches per minute. Pipe connections 219 and 220 at the opposite ends of the hydraulic cylinder 133 extend to the pipe connections 195 and 196 for the hydraulic cylinder 6. Valves 221 and 222 in the pipe connections 219 and 220 and valves 223 and 224 in pipe connections 195 and 196 provide means to make either the upper hydraulic cylinder 6 (for wheel grinding) or the lower hydraulic cylinder 133 (for axle journal grinding) inoperative while the other is in operation.

Although I have shown and described my invention in considerable detail, I do not wish to be limited to the exact construction shown and described but may use such substitutions, modifications or equivalents thereof, as are embraced within the scope of my invention, or as pointed out in the claims.

I claim:

1. A machine for grinding the treads and flanges of railway wheels mounted on an axle, comprising a base plate, means for supporting the axle and wheels mounted thereon for rotation, end frame members mounted on the base plate, a support bar between said end frame members, grinding means pivotally movable on said support bar into engagement with the railway wheel treads and flanges for grinding the same, independently driven roller means mounted on the base plate in driving engagement with the lateral side tread of one of the railway wheels for rotating the wheels and axle, and rack and pinion means for laterally and longitudinally adjusting the driving means.

2. A machine for grinding the treads and flanges of railway wheels mounted on an axle, comprising a base plate, means for supporting the axle and wheels mounted thereon for rotation, rigid end frames bolted to the base plate, bearing blocks adjustably mounted on said end frames, a support bar terminally mounted in said bearing blocks, grinding means pivotally movable on the support bar into engagement with the railway wheels and flanges for grinding the same, a pair of friction rollers mounted on the base plate in driving engagement with the tread of one of the railway wheels for rotating the wheels and axle, means rack and pinion for longitudinally adjusting the friction rollers to align them with the tread of one of the railway wheels, and additional rack and pinion means for laterally adjusting the friction rollers into and out of engagement with the tread of the railway wheel.

3. A machine for grinding the treads and flanges of railway wheels mounted on an axle, comprising a base plate, spaced end frames mounted on the base plate, a bearing mounted on each end frame, a support bar having its ends mounted in the bearings and held thereby against rotation, means for supporting the axle and wheels mounted thereon for rotation, a driving attachment mounted on the base plate having friction wheels for engaging the tread of one of the railway wheels, a motor driven speed reducer with a chain and sprocket connection therefrom for rotating the friction wheels in contact with the railway wheel, a pair of grinding wheel assemblies mounted for longitudinal sliding movement on the support bar each provided with a grinding wheel, fluid pressure means for longitudinally adjusting the grinding wheel assemblies to align the grinding wheels with the treads and flanges of the railway wheels, and means actuated by fluid pressure for vertically adjusting the grinding wheels into or out of engagement with the treads and flanges of the railway wheels.

4. A machine for grinding the treads and flanges of railway wheels mounted on an axle, comprising a base plate, a pair of spaced end frames, a support bar having its ends mounted on the end frames and held thereby against rotation, means for supporting the axle and wheels for rotation, a driving attachment mounted on the base plate having friction wheels for engaging the tread of one of the railway wheels, a motor driven variable speed reducer for rotating the friction wheels in contact with the tread of the railway wheel, means for laterally and longitudinally adjusting the friction wheels, a grinding wheel assembly mounted for longitudinal sliding movement on the support bar provided with a grinding wheel, fluid pressure means for longitudinally adjusting the grinding wheel assembly to align the grinding wheel with the treads and flanges of the railway wheels, an adjusting screw actuated by a hydraulic motor for vertically adjusting the grinding wheel into or out of engagement with the tread and flanges of the railway wheels, and means for controlling the supply of fluid pressure to the hydraulic motor.

5. A machine for grinding the treads and flanges of railway wheels mounted on an axle, comprising a base plate, spaced end frames mounted on the base plate, a bearing mounted on each end frame, a support bar having its ends mounted in the bearings and held thereby against rotation, means for supporting the axle and wheels mounted thereon for rotation, a driving attachment mounted on the base plate having friction wheels for engaging the tread of one of the railway wheels, a motor driven variable speed reducer with a chain and sprocket connection therefrom for rotating the friction wheels in contact with the railway wheels, means for laterally and longitudinally adjusting the friction wheels, means for forcing the friction wheels into contact with the tread of the railway wheel, a pair of grinding wheel assemblies mounted for longitudinal sliding movement on the support bar each provided with a grinding wheel, fluid pressure means for longitudinally adjusting the grinding wheel assemblies to align the grinding wheels with the treads and flanges of the railway wheels, and means actuated by fluid pressure for vertically adjusting the grinding wheels into or out of engagement with the treads and flanges of the railway wheels.

6. A machine for grinding the treads and flanges of railway wheels mounted on an axle, comprising a base plate, spaced end frames mounted on the base plate, a bearing block mounted on each end frame, a support bar having its ends mounted in the bearing blocks and held thereby against rotation, means for supporting the axle and wheels mounted thereon for rotation, a pair of grinding wheel assemblies mounted for longitudinal sliding movement on the support bar each provided with a grinding wheel, fluid pressure means for longitudinally adjusting the grinding wheel assemblies to align the grinding wheels with the treads and flanges of the railway wheels, a driving attachment mounted on the base plate having friction wheels adapted to engage the tread of one of the railway wheels, a motor driven speed reducer with a chain and sprocket connection for rotating the friction wheels and thereby rotating the railway wheel and axle assembly, means for longitudinally and transversely adjusting the friction wheels, means actuated by fluid pressure for vertically adjusting the grinding wheels into or out of engagement with the treads and flanges of the railway wheels, and means for adjusting the bearing blocks for the support bar laterally for shifting the support bar and the grinding wheel assemblies mounted thereon for grinding railway wheels of different diameters.

7. A machine for grinding the tread and flanges of railway wheels while mounted on an axle, comprising a base plate, a pair of spaced end frames mounted on the base plate, a support bar having its ends mounted in bearings on the end frames and held thereby against rotation, a pair of spaced pedestals mounted on the base plate adjacent to the end frames, a center bearing spindle mounted in each pedestal each having a cone center at its inner end adapted to engage the axle centers of the wheel assembly for supporting the axle and wheels mounted thereon for rotation, a grinding wheel assembly mounted for longitudinal sliding movement on the support bar provided with a grinding wheel, fluid pressure means for longitudinally adjusting the grinding wheel assembly to align the grinding wheel with the treads and flanges of the railway wheels, a driving attachment mounted on the base plate having friction wheels for engaging the tread of one of the railway wheels, means for rotating the friction wheels for rotating the railway wheels and axle assembly, an adjusting screw actuated by a hydraulic motor for vertically adjusting the grinding wheel into and out of engagement with the tread and flanges of the railway wheels, means for controlling the supply of fluid pressure to the hydraulic motor, and means for adjusting the bearing blocks for the support bar laterally for shifting the support bar and the grinding wheel assembly mounted thereon for grinding railway wheels of different diameters.

8. A machine for grinding the treads and flanges of railway wheels while mounted on an axle, comprising a base plate, a pair of spaced end frames mounted on the base plate, a bearing block mounted on each end frame, a support bar having its ends mounted in said bearing blocks and held thereby against rotation, a pair of spaced pedestals mounted on the base plate adjacent to the end frames, a center bearing spindle mounted in each of the pedestals each having a cone center at its inner end adapted to engage the axle centers of the wheel and axle assembly for supporting the axle and wheels mounted thereon for rotation, a grinding wheel assembly mounted for longitudinal sliding movement on the support bar provided with a grinding wheel, fluid pressure means for longitudinally adjusting the grinding wheel assembly to align the grinding wheel with the treads and flanges of the railway wheels, a driving attachment mounted on the base plate having friction wheels for engaging the tread of one of the railway wheels, means for rotating the friction wheels for rotating the railway wheel and axle assembly, an adjusting screw actuated by a hydraulic motor for vertically adjusting the grinding wheel into and out of engagement with the tread and flanges of the railway wheels, means for controlling the supply of fluid pressure to the hydraulic motor, and means for adjusting the bearing blocks for the support bar laterally for shifting the support bar and the grinding wheel assembly mounted thereon for grinding wheels of different diameters.

9. A machine for grinding the treads and flanges of railway wheels mounted on an axle, comprising a base plate, spaced end frames mounted on the base plate, a bearing block mounted on each end frame, a single cylindrical support bar having its ends clamped in the bearing blocks and held thereby against rotation, means for supporting the axle and wheels mounted thereon for rotation, a pair of grinding wheel assemblies mounted for longitudinal sliding movement on the support bar each provided with a grinding wheel, and means for laterally adjusting the bearing blocks for the support bar with the grinding wheel assemblies mounted thereon for grinding railway wheels of different diameters.

10. A machine for grinding the treads and flanges of railway wheels mounted on an axle, comprising a base plate, spaced end frames mounted on the base plate, a bearing block mounted on each end frame, a massive cylinder support bar having its ends clamped securely in the bearing blocks and held thereby against rotation, means for supporting the axle and wheels mounted thereon for rotation, power driven friction wheels mounted on the base plate and movable into engagement with the tread of one of the wheels whereby the wheels and axle may be rotated by the power driven friction wheels, a pair of grinding wheel assemblies mounted for longitudinal sliding movement on the support bar each provided with a grinding wheel, fluid pressure means for longitudinally adjusting the grinding wheel assemblies to align the grinding wheels with the treads and flanges of the railway wheels, means actuated by fluid pressure for vertically adjusting the grinding wheels into or out of engagement with the treads and flanges of the railway wheels, and means for adjusting the bearing blocks for the support bar laterally for shifting the support bar and the grinding wheel assemblies mounted thereon for grinding railway wheels of different diameters.

11. A machine for grinding the treads and flanges of railway wheels while mounted on an axle, comprising a base plate, a pair of spaced end frames mounted on the base plate, a support bar having its ends mounted in bearings on the end frames and held thereby against rotation, a pair of spaced pedestals mounted on the base plate adjacent to the end frames, means for adjusting the pedestals, a center bearing spindle mounted in each of the pedestal, each having a cone center at its inner end adapted to engage the axle centers of the wheel and axle assembly for supporting the axle and wheels mounted thereon for rotation, means for longitudinally adjusting the center bearing spindles, a pair of grinding wheel assemblies mounted for longitudinal sliding movement on the support bar each provided with a grinding wheel, fluid pressure means for longitudinally adjusting the grinding wheel assemblies to align the grinding wheels with the treads and flanges of the railway wheels, means for vertically adjusting the grinding wheels into and out of engagement with the railway wheels, a driving attachment mounted on the base plate having friction wheels for engaging the tread of one of the railway wheels, means for longitudinally adjusting the friction wheels to align them with one of the railway wheel treads, means for transversely adjusting the friction wheels to move them into driving engagement with the railway wheels, and a motor driven speed reducer with a chain and sprocket connection therefrom for rotating the friction wheels in contact with the tread of one of the railway wheels.

12. A machine for grinding the treads and flanges of railway wheels mounted on an axle, comprising a base plate, means for supporting the axle and wheels mounted thereon for rotation, grinding wheels movable into engagement with the treads and flanges of the wheels for grinding the same, a supporting plate mounted on the base plate, longitudinally extending slide bars mounted on the supporting plate, a longitudinally movable slide plate mounted upon the slide bars, a transversely movable slide plate mounted on the longitudinally movable slide plate, a driving attachment mounted on the transversely movable slide plate having a pair of rubber-tired friction wheels adapted to simultaneously engage the tread of a railway wheel, means for adjusting the longitudinal slide plate to align the friction wheels with the tread of one of the railway wheels, means for adjusting the transverse slide plate for the friction wheels to move them into driving engagement with the tread of one of the railway wheels, and means for rotating the friction wheels in driving contact with the tread of one of the railway wheels.

13. A machine for grinding the treads and flanges of railway wheels mounted on an axle, comprising a base plate, means for supporting the axle and wheels mounted thereon for rotation, grinding wheels movable into engagement with the treads and flanges of the wheels for grinding the same, a supporting plate mounted on the base plate, a plurality of spaced longitudinally extending bars mounted on the supporting plate forming a slideway, a longitudinally movable slide plate on said slideway, longitudinally extending clamp rails attached to the upper surface of the supporting plate adjacent to its longitudinal edges for guiding and securing the longitudinal edges of the slide plate in place, a pair of spaced flanges extending centrally from one of the transverse side edges of the longitudinally movable slide plate, a shaft journaled in the flanges, a pinion mounted on the shaft for engaging a rack mounted on the supporting plate, clamp bars secured to the upper surface of the transverse side edges of the longitudinally movable slide plate, a transverse movable slide plate mounted on the longitudinal slide plate between the transverse clamp bars, a driving attachment mounted on the transversely movable slide plate having friction wheels adapted to engage the tread of a railway wheel, means for rotating the pinion for adjusting the longitudinal slide plate to align the friction wheels with the tread of one of the railway wheels, means for adjusting the transverse slide plate for the friction wheels to move into driving engagement with the tread of one of the railway wheels, and a motor driven variable speed reducer with a chain and sprocket connection therefrom for rotating the friction wheels in driving contact with the tread of one of the railway wheels.

14. A machine for grinding the treads and flanges of railway wheels mounted on an axle, comprising a base plate, means for supporting the axle and wheels mounted thereon for rotation, grinding wheels movable into engagement with the treads and flanges of the wheels for grinding the same, a supporting plate mounted on the base plate, a plurality of spaced longitudinally extending bars mounted on and secured to the supporting plate forming a slideway, a longitudinally movable slide plate on said slideway, longitudinally extending clamp rails attached to the upper surface of the supporting plate adjacent to its longitudinal edges for guiding and securing the longitudinal edges of the slide plate in place, means for longitudinally adjusting said slide plate, clamp bars secured to the upper surface of the transverse side edges of the longitudinally movable slide plate, a transversely movable slide plate mounted on the longitudinally movable slide plate, a transverse movable slide plate mounted on the longitudinal slide plate between the transverse clamp bars and having its transverse edges guided and secured by said clamp bars, a driving attachment mounted on the transversely movable slide plate having friction wheels mounted on shafts adapted to engage the tread of a railway wheel, means for adjusting the longitudinal slide plate to align the friction wheels with the tread of one of the railway wheels, a pair of spaced flanges extending from the longitudinal side edge of the transversely movable slide plate, a shaft journaled in said spaced flanges, a pair of pinions mounted on the shaft each adapted to engage a rack mounted on the longitudinally movable slide plate, means for rotating the shaft and pinions for adjusting the transverse slide plate to move the friction wheels into driving engagement with the tread of one of the railway wheels, a pair of screw jacks mounted for adjustment on the longitudinally movable slide plate having adjusting screws for engaging the edge of the transversely movable slide plate adjacent to the pinions to give proper pressure between the friction wheels and the tread of the railway wheel, a motor driven variable speed reducer mounted on the transversely movable slide plate, and a chain and sprocket connection between the motor and the shafts of the friction wheels for rotating the friction wheels in contact with the tread of one of the railway wheels.

15. A machine for grinding the treads and flanges for railway wheels mounted on an axle, comprising a base plate, means for supporting the axle and wheels mounted thereon for rotation, grinding wheels movable into engagement with the treads and flanges of the railway wheels for grinding the same, a supporting plate mounted on the base plate, a longitudinally movable slide plate mounted on the supporting plate having a transversely movable slide plate mounted thereon, a driving attachment mounted on the transversely movable slide plate having a pair of friction wheels each mounted on a shaft, means for adjusting the longitudinally movable slide plate to align the friction wheels with the tread of one of the railway wheels, means for adjusting the transverse slide plate to move both the friction wheels horizontally into simultaneous driving engagement with the tread of one of the railway wheels, a motor driven variable speed reducer mounted on the transversely movable slide plate, and a chain and sprocket connection between the motor and the shafts for friction wheels for rotating the friction wheels in contact with the tread of one of the railway wheels.

16. A machine for grinding railway axle journals having wheels mounted thereon, comprising a base plate, a pair of spaced pedestals mounted on the base plate, a center bearing spindle mounted in each pedestal, each having a cone center at its inner end adapted to engage the axle centers, a driving attachment mounted on the base plate having friction wheels for engaging the tread of one of the railway wheels, means for rotating the friction wheels for rotating the railway wheels and axle assembly, means for moving the friction wheels into and out of engagement with the railway wheels, a bed plate mounted on the base plate, a journal grinding attachment mounted on the bed plate, transverse and longitudinal slideways with slides mounted therein supported on the bed plate, a plate mounted above the slideways upon which the grinding unit is mounted consisting of a bracket for supporting the spindle for a grinding wheel and a casing for the driving mechanism, a spindle cover mounted on the bracket, a spindle mounted therein having a grinding wheel attached to its inner end and a pulley secured to its outer end in the driving mechanism casing, a motor mounted on the supporting plate for the unit having a shaft extending into the casing for the driving mechanism, a driving pulley mounted thereon, a belt connecting the driving pulley on the motor shaft with the pulley on the outer end of the spindle for the grinding wheel, a feed screw threaded in a nut in the transverse slide adapted to be manually operated for feeding the grinding wheel to engage the axle journal, and a fluid pressure cylinder having a piston rod attached to the longitudinal slide for reciprocating the grinding wheel in contact with the axle journal.

17. A machine for grinding railway axle journals having wheels mounted thereon, comprising a base plate having a longitudinally extending machined slot formed therein, a pair of spaced pedestals mounted on the base plate having a machined tongue on the bottom extending into the machined slot in the base plate and permitting longitudinally adjusting the pedestals, means for locking the pedestals after adjustment, a center bearing spindle mounted in each pedestal having a cone center at its inner end to align the same, a driving attachment for the axle and wheel assembly mounted on the base plate having friction wheels for engaging the tread of one of the wheels, means for rotating the friction wheels for rotating the wheel and axle assembly, a bed plate mounted on the base plate, a journal grinding attachment mounted on the bed plate, a grinding wheel assembly mounted on the bed plate provided with a cup grinding wheel, means for rotating the cup grinding wheel, means for transversely feeding the cutting lips of the rotating cup grinding wheel to the axle journal manually, and means actuated by fluid pressure for reciprocating the cup grinding wheel in contact with the axle journal.

18. A machine for grinding railway axle journals having wheels mounted thereon, comprising a base plate, a pair of spaced pedestals mounted on the base plate, a threaded bearing mounted on each pedestal, a tubular casing threaded in said bearing, a shaft in each tubular casing having a cone center at its inner end adapted to engage the axle centers to align the same, a hand wheel secured to the outer end of each tubular casing for adjustment, a driving attachment mounted on the base plate having friction wheels for engaging the tread of one of the railway wheels, a motor driven variable speed reducer having a connection with the friction wheels for rotating the railway wheels and axle assembly, means for aligning and moving the friction wheels into driving engagement with the tread of one of the railway wheels, a bed plate mounted on the base plate, a journal grinding assembly mounted on the bed plate, transverse and longitudinal slideways with transverse and longitudinal slide plates mounted therein supported on the bed plate, a grinding unit mounted on the transverse slide plate and consisting of a bracket for supporting the spindle for a grinding wheel and a casing for the driving mechanism, a spindle cover mounted on the bracket, a spindle mounted therein having a grinding wheel attached to its inner end and a pulley secured to its outer end in the driving mechanism casing, a motor mounted on the supporting plate for the unit having a shaft extending into the casing for the driving mechanism, a driving pulley mounted thereon, a belt connecting the driving pulley on the motor shaft with the pulley on the outer end of the spindle for the grinding wheel, means for adjusting the belt tension, a feed screw threaded in a split nut secured to the transverse slide plate adapted to be manually operated for feeding the grinding wheel to engage the axle journal, means for removing lost motion in the feed screw, and a fluid pressure cylinder having a piston rod attached to the longitudinal slide plate for reciprocating the grinding wheel in contact with the axle journal.

19. A machine for grinding railway axle journals having wheels mounted thereon, comprising a base plate, a machined slot formed in the base plate, means for supporting the wheel and axle assembly for rotation, a bed plate mounted on the base having a tongue on its lower surface extending into the machined slot in the base plate, a cup grinding wheel movable into engagement with the axle journal for grinding the same, friction wheels mounted on the base plate and adapted to be both adjusted into driving contact with the tread of one of the railway wheels for rotating the axle, manually controlled means for transversely feeding the cup grinding wheel to the axle journal, and fluid pressure means for reciprocating the cup grinding wheel with its cutting lip in contact with the axle journal.

20. A machine for grinding railway axle journals having wheels mounted thereon, comprising a base plate, means for supporting the axle and wheels mounted thereon for rotation, a driving attachment mounted on the base plate having friction wheels for engaging the tread of one of the wheels, means for rotating the friction wheels for rotating the wheel and axle assembly, a bed plate mounted on the base plate, a journal grinding attachment mounted on the bed plate, transverse and longitudinal slideways supported on the bed plate, transverse and longitudinal slide plates mounted above the slideways, a grinding unit mounted on the transverse slide plate and consisting of a bracket for supporting the spindle for a cup grinding wheel and a casing for the driving mechanism, a spindle cover mounted on the bracket, a spindle mounted therein having a cup grinding wheel attached to its inner end and a pulley secured to its outer end in the driving mechanism casing, a shield mounted above the cup grinding wheel and clamped to the end of the spindle cover adjacent to the cup grinding wheel, a motor mounted on the supporting plate for the unit having a shaft extending into the casing for the driving mechanism, a driving pulley mounted thereon, a belt connecting the driving pulley on the motor shaft with the pulley on the outer end of the spindle for the cup grinding wheel, a feed screw threaded in a split nut secured to the transverse slide plate adapted to be manually operated for feeding the cup grinding wheel transversely to engage the axle journal, and a fluid pressure cylinder having a piston rod with its outer end attached to the longitudinal movable slide for reciprocating the cup grinding wheel in contact with the axle journal.

21. A machine for grinding railway axle journals having wheels mounted thereon, comprising a base plate, means for supporting the axle wheels mounted thereon for rotation, a driving attachment mounted on the base having friction wheels for engaging the tread of one of the railway wheels, a motor driven variable speed reducer with a chain and sprocket connection therefrom for rotating the friction wheels in contact with the railway wheels, means for laterally and longitudinally adjusting the friction wheels, means for forcing the friction wheels into contact with the tread of one of the railway wheels, a bed plate mounted on the base plate, a journal grinding attachment mounted on the bed plate, transverse and longitudinal slideways supported on the bed plate, transverse and longitudinal slide plates mounted above the slideways, a grinding unit mounted on the transverse slide plate and consisting of a bracket for supporting the spindle for a grinding wheel and a casing for the driving mechanism, a spindle cover mounted on the bracket, a spindle mounted therein having a grinding wheel attached to its inner end and a pulley secured to its outer end in the driving mechanism casing, a motor mounted on the supporting plate for the unit having a shaft extending into the casing for the driving mechanism, a driving pulley mounted thereon, a belt connecting the driving pulley on the motor shaft with a pulley on the outer end of the spindle for the grinding wheel, a feed screw threaded in a unit secured to the transverse slide plate adapted to be manually operated for feeding the grinding wheel to engage the axle journal, and a fluid pressure cylinder having a piston rod having its outer end attached to the longitudinally movable slide plate for reciprocating the grinding wheel in contact with the axle journal.

22. A machine for grinding railway axle journals having wheels mounted thereon, comprising a base plate, means for supporting the axle and wheels mounted thereon for rotation, a support plate mounted on the base plate, a longitudinally movable slide plate mounted on the support plate having a transversely movable slide plate mounted thereon, a driving attachment mounted on the transversely movable slide plate having a pair of friction wheels each mounted on a shaft, means for adjusting the longitudinally movable slide plate to align the friction wheels with the tread of one of the railway wheels, means for adjusting the transverse slide plate to move the friction wheels into driving engagement with the tread of one of the railway wheels, a motor driven variable speed reducer mounted on the transversely movable slide plate, a chain and sprocket connection between the motor and the shaft for the friction wheels for rotating the friction wheels in contact with the tread of one of the railway wheels, a bed plate mounted on the base plate, a journal grinding assembly mounted on the bed plate provided with a cup grinding wheel, means for transversely feeding the cup grinding wheel to the axle journal manually, and means actuated by fluid pressure for reciprocating the cup grinding wheel in contact with the axle journal.

23. A machine for grinding railway axle journals having wheels mounted thereon, comprising a base plate, a pair of spaced pedestals mounted on the base plate, internally threaded and smooth bearings mounted on each pedestal, a tubular casing mounted in each pair of bearings having a threaded outer portion coacting with the threaded bearing, and a smooth portion coacting with the smooth bearing, a shaft mounted in each tubular casing having a cone center at its inner end adapted to engage the axle centers to align the same, a hand wheel secured to the outer end of each tubular casing for adjusting the center, a laterally extending split formed through the side of each bearing, a set bolt extending transversely through the split portion for adjustment to hold the tubular casing locked after adjustment, a driving attachment mounted on the base plate having friction wheels for engaging the tread of one of the railway wheels, a motor driven variable speed reducer having a connection with the friction wheels for rotating the railway wheel and axle assembly, means for aligning and moving the friction wheels into driving engagement with the tread of one of the railway wheels, a bed plate mounted on the base plate, a journal grinding assembly mounted on the bed plate, transverse and longitudinal slideways with slides mounted therein supported on the bed plate, a plate mounted above the slideways upon which the grinding unit is mounted, consisting of a bracket for supporting the spindle for a grinding wheel and a casing for the driving mechanism, a spindle cover mounted on the bracket, a spindle mounted therein having a grinding wheel attached to its inner end and a pulley secured to its outer end in the driving mechanism casing, a motor mounted on the supporting plate for the unit having a shaft extending into the casing for the driving mechanism, a driving pulley mounted thereon, a belt connecting the driving pulley on the outer end of the spindle for the grinding wheel, adjustable idler pulleys engaging the belt for adjusting the belt tension, a feed screw threaded in a split nut secured to the transverse slide adapted to be manually operated for feeding the grinding wheel to engage the axle journal, means for removing lost motion in the feed screw, and a fluid pressure cylinder having a piston rod attached to the longitudinal slide for reciprocating the grinding wheel in contact with the axle journal.

24. A machine for grinding the treads and flanges of railway wheels mounted on an axle, comprising a base plate, means for supporting the axle and wheels mounted thereon for rotation, grinding means movable into engagement with the railway wheels and flanges for grinding the same, a pair of friction wheels mounted on the base plate and having resilient peripheral surfaces adapted to be laterally moved in unison into driving engagement with the tread of one of the railway wheels for rotating the wheels and axle, said friction wheels being arranged at equal distances from the horizontal plane passing through the axis of the work as sustained for rotation, means for longitudinally adjusting the friction wheels to align them with the tread of one of the railway wheels, and means for laterally adjusting the friction wheels into and out of engagement with the tread of one of the railway wheels.

25. A machine for grinding railway axle journals having wheels mounted thereon, comprising a base plate, a pair of spaced pedestals mounted on the base plate, a center bearing spindle mounted in each pedestal adapted to engage the axle centers for supporting the axle and wheels mounted thereon for rotation, a driving attachment mounted on the base plate including a pair of shafts and having a pair of friction wheels each mounted on a shaft adapted to be adjusted laterally into simultaneous driving engagement with the tread of one of the railway wheels, the shafts of said friction wheels being arranged at equal distances from the horizontal plane passing through the axis of the work as sustained for rotation, a motor driven variable speed reducer, a chain and sprocket connection between the motor and the shafts for the friction wheels for rotating the railway wheels and axle assembly, a bed plate mounted on the base plate, a journal grinding attachment mounted on the bed plate, a grinding wheel mounted on the journal grinding attachment, means for rotating the grinding wheel, transverse and longitudinal slideways with slides supported on the bed plate, a feed screw having a threaded connection with the transverse slide adapted to be manually operated for feeding the grinding wheel transversely of the axle journal, and a fluid pressure cylinder having a piston rod attached to the longitudinally movable slide for reciprocating the grinding wheel in contact with the axle journal.

26. A tailstock, comprising a pedestal support, bearings mounted on top of the pedestal support, a tubular casing mounted in the bearings, a tail cap secured to the outer end of the tubular casing, a shaft mounted in the tubular casing and adapted to reciprocate therewith, an extending inner end portion for the shaft formed with a cone center, a yoke formed with flat side plates and spacing blocks at the center and end portions, a shaft having one end threaded in the tail cap for the tubular casing and extending outwardly through the central spacing block for the yoke and secured thereto, a fluid pressure cylinder mounted on the pedestal support on opposite sides of the tubular casing, and a piston rod for each cylinder, having its outer end attached to the spacing blocks at the ends of the yoke for adjusting the tubular casing and cone center.

References Cited in the file of this patent

UNITED STATES PATENTS

| | | |
|---|---|---|
| 145,775 | Allison | Dec. 23, 1873 |
| 288,717 | McIntyre | Nov. 20, 1883 |
| 288,718 | McIntyre | Nov. 20, 1883 |
| 810,903 | Blechschmidt | Jan. 30, 1906 |
| 869,194 | Norton | Oct. 22, 1907 |
| 871,522 | Peirce | Nov. 19, 1907 |
| 1,005,538 | Greaves | Oct. 10, 1911 |
| 1,859,737 | Guild | May 24, 1932 |
| 2,065,151 | Peaslee | Dec. 22, 1936 |
| 2,164,491 | Bitler | July 4, 1939 |
| 2,170,494 | Ernst | Aug. 22, 1939 |
| 2,180,529 | Kaseberg | Nov. 21, 1939 |
| 2,338,125 | May | Jan. 4, 1944 |
| 2,374,928 | Frauenthal | May 1, 1945 |
| 2,383,496 | Nebolsine | Aug. 28, 1945 |
| 2,546,225 | Julian | Mar. 27, 1951 |
| 2,558,017 | Tack | June 26, 1951 |
| 2,605,591 | Hill | Aug. 5, 1952 |
| 2,626,492 | Balsiger | Jan. 27, 1953 |
| 2,647,349 | Silven | Aug. 4, 1953 |

FOREIGN PATENTS

| | | |
|---|---|---|
| 276,473 | Great Britain | Sept. 1, 1927 |
| 390,527 | Germany | Feb. 20, 1924 |